(12) United States Patent
Sedin et al.

(10) Patent No.: US 12,745,118 B2
(45) Date of Patent: Sep. 22, 2026

(54) CLI REPORTING FOR MCG/SCG FAILURE

(71) Applicant: Telefonaktiebolaget LM Ericsson (PUBL), Stockholm (SE)

(72) Inventors: Jonas Sedin, Sollentuna (SE); Lian Araujo, Stockholm (SE); Icaro Leonardo Da Silva, Solna (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 944 days.

(21) Appl. No.: 17/796,495

(22) PCT Filed: Feb. 12, 2021

(86) PCT No.: PCT/IB2021/051189
§ 371 (c)(1),
(2) Date: Jul. 29, 2022

(87) PCT Pub. No.: WO2021/161249
PCT Pub. Date: Aug. 19, 2021

(65) Prior Publication Data

US 2023/0413088 A1 Dec. 21, 2023

Related U.S. Application Data

(60) Provisional application No. 62/976,243, filed on Feb. 13, 2020.

(51) Int. Cl.
*H04W 24/10* (2009.01)
*H04B 17/345* (2015.01)
(Continued)

(52) U.S. Cl.
CPC .......... *H04W 24/10* (2013.01); *H04B 17/345* (2015.01); *H04W 24/02* (2013.01); *H04W 24/08* (2013.01)

(58) Field of Classification Search
CPC ..... H04W 24/10; H04W 24/02; H04W 24/08; H04B 17/345
See application file for complete search history.

(56) References Cited

U.S. PATENT DOCUMENTS 10,644,845 B2 * 5/2020 Yang .................... H04L 5/0053
11,196,493 B2 * 12/2021 Hwang ............... H04B 17/318
(Continued)

FOREIGN PATENT DOCUMENTS

CN 110999516 A1 4/2020

OTHER PUBLICATIONS

3GPP TSG-RAN2 Meeting #107bis; R2-1916338; "Introduction of Cross Link Interference (CLI) handling and Remote Interference Management (RIM)"; Reno, USA; Nov. 18-22, 2019; 55 pages.
(Continued)

*Primary Examiner* — Abdullahi E Salad
(74) *Attorney, Agent, or Firm* — Sage Patent Group

(57) ABSTRACT

According to some embodiments, a method performed by a wireless device capable of operating in dual connectivity with a first network node in a first cell group and a second network node in a second cell group comprises: receiving a measurement configuration message that includes an indication to perform cross-link interference (CLI) measurements; detecting radio link failure (RLF) with the first cell group; determining that CLI measurements are available; including CLI measurement information in a first cell group failure report; and transmitting the first cell group failure report to the second network node.

18 Claims, 18 Drawing Sheets

(51) Int. Cl.
*H04W 24/02* (2009.01)
*H04W 24/08* (2009.01)

(56) References Cited

U.S. PATENT DOCUMENTS

| | | | | |
|---|---|---|---|---|
| 11,343,737 | B2 * | 5/2022 | Park | H04W 80/02 |
| 2016/0198357 | A1 * | 7/2016 | Tamura | H04W 24/10 370/242 |
| 2020/0252847 | A1 | 8/2020 | Park et al. | |
| 2022/0086843 | A1 * | 3/2022 | Ying | H04W 72/541 |
| 2022/0095240 | A1 * | 3/2022 | Ying | H04B 17/336 |
| 2022/0104214 | A1 * | 3/2022 | Ying | H04W 72/1273 |
| 2024/0007893 | A1 * | 1/2024 | Li | H04L 5/0051 |

OTHER PUBLICATIONS

First Office Action mailed Jul. 30, 2024 for Chinese Patent Application No. 202180014388.9, 13 pages (includes English translation).

3GPP TS 38.213 V15.5.0 (Mar. 2019); 3rd Generation Partnership Project; Technical Specification Group Radio Access Network; NR; Physical layer procedures for control (Release 15).

3GPP TSG RAN WG1 Ad-Hoc Meeting 1901; Taipei, China; Source: Intel Corporation; Title: UE-to-UE CLI measurement and reporting (R1-1900489)—Jan. 21-26, 2019.

3GPP TSG-RAN WG2 Meeting #103bis; Chengdu, China; Change Request; Title: Introduction of NR-DC (R2-1814893)—Sep. 8-12, 2018.

PCT International Search Report issued for International application No. PCT/IB2021/051189—May 6, 2021.

PCT Written Opinion of the International Searching Authority issued for International application No. PCT/IB2021/051189—May 6, 2021.

3GPP TSG-RAN WG2 Meeting #109; Athens, Greece; Change Request; Title: [108#28][R16 RRC] 38331 Rel-16 CR Merge (R2-20xxxxx)—Feb. 24-28, 2020.

3GPP TS 38.331 v16.3.1; Technical Specification; 3rd Generation Partnership Project; Technical Specification Group Radio Access Network; NR; Radio Resource Control (RRC) protocol specification (Release 16)—Jan. 2021.

3GPP TR 38.802 v14.2.0; Technical Report; 3rd Generation Partnership Project; Technical Specification Group Radio Access Network; Study on New Radio Access Technology Physical Layer Aspects (Release 14)—Sep. 2017.

3GPP TS 38.331 v15.18.0; Technical Specification; 3rd Generation Partnership Project; Technical Specification Group Radio Access Network; NR; Radio Resource Control (RRC) protocol specification (Release 15)—Jun. 2022.

* cited by examiner 106
160b
110b
110c
160
162
190
192
194
196
198
170
172
174
180
184
186
187
110
111
112
114
116
118
120
122
124
126
130
132
134
136
137

243a Network
243b Network
200
201 Processor
205 Input/Output Interface
209 RF Interface
211 Network Connection Interface
213 Power Source
202 Bus
215 Memory
217 RAM
219 ROM
221 Storage Medium
223 Operating System
225 Application Programs
227 Data
231 Communication Subsystem
233 Transmitter
235 Receiver

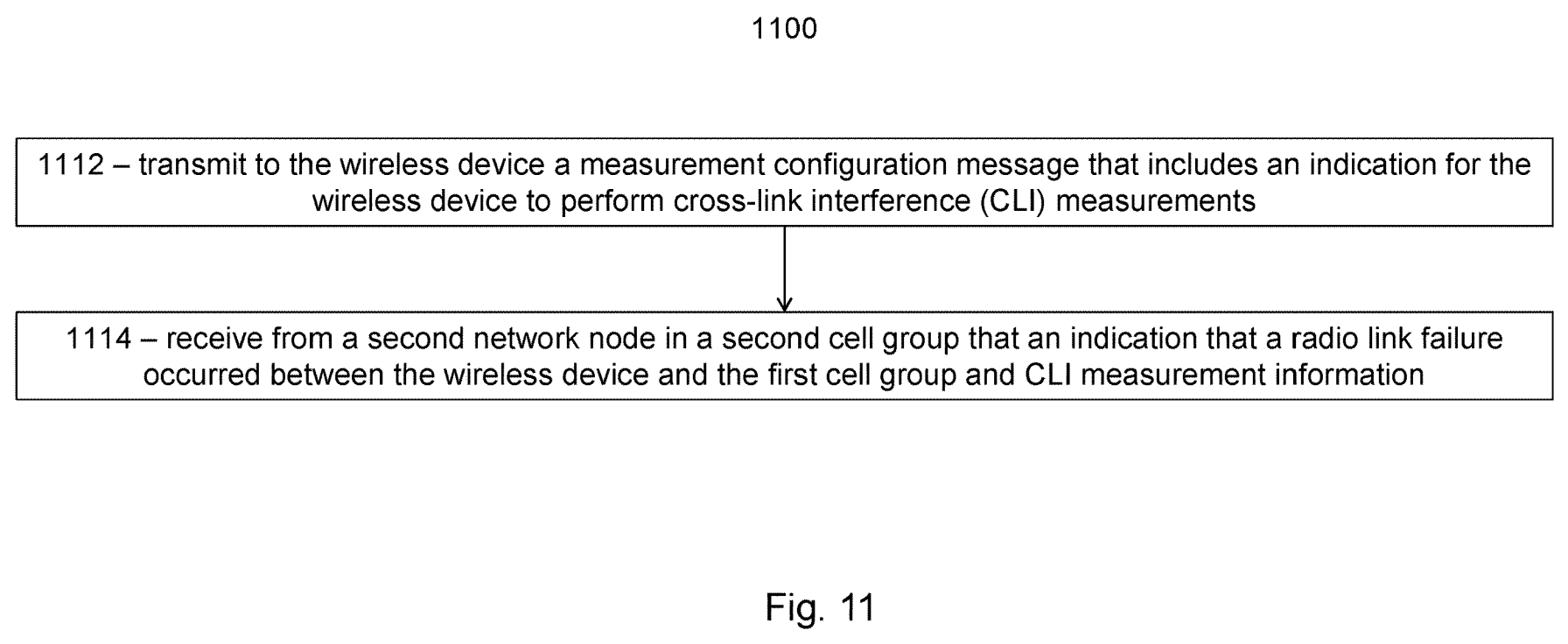

1100

1112 – transmit to the wireless device a measurement configuration message that includes an indication for the wireless device to perform cross-link interference (CLI) measurements 1114 – receive from a second network node in a second cell group that an indication that a radio link failure occurred between the wireless device and the first cell group and CLI measurement information

Fig. 11

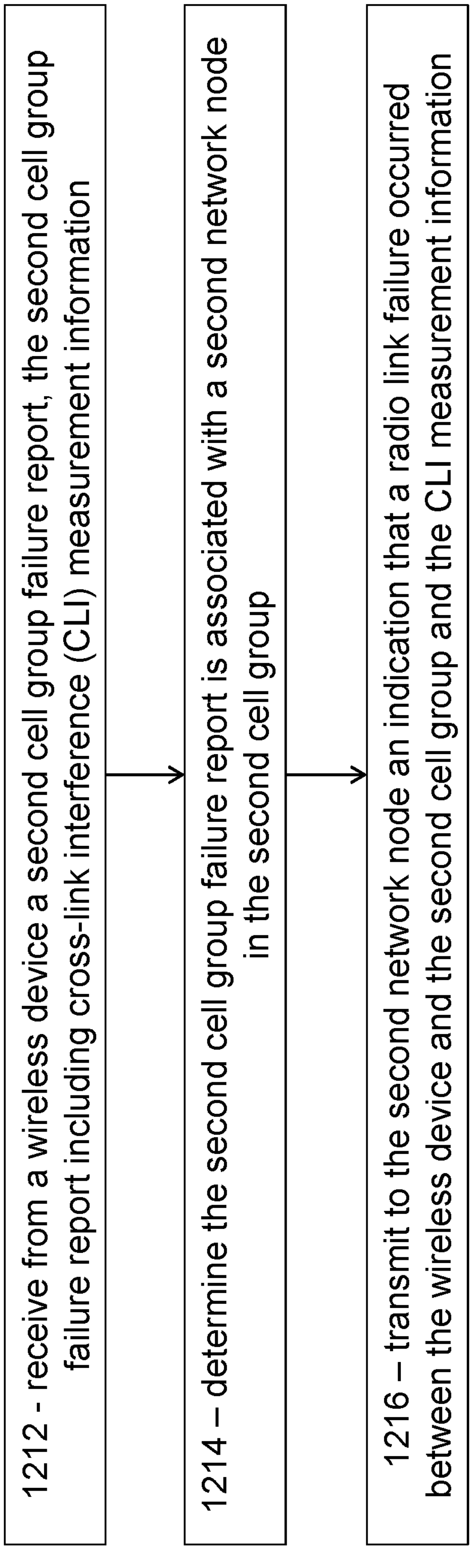
1200
1212 - receive from a wireless device a second cell group failure report, the second cell group failure report including cross-link interference (CLI) measurement information
1214 – determine the second cell group failure report is associated with a second network node in the second cell group
1216 – transmit to the second network node an indication that a radio link failure occurred between the wireless device and the second cell group and the CLI measurement information

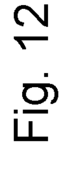
Fig. 12

CLI REPORTING FOR MCG/SCG FAILURE

PRIORITY

This nonprovisional application is a U.S. National Stage Filing under 35 U.S.C. § 371 of International Patent Application Serial No. PCT/IB2021/051189 filed Feb. 12, 2021 and entitled "CLI REPORTING FOR MCG/SCG FAILURE" which claims priority to U.S. Provisional Patent Application No. 62/976,243 filed Feb. 13, 2020 both of which are hereby incorporated by reference in their entirety.

TECHNICAL FIELD

Embodiments of the present disclosure are directed to wireless communications and, more particularly, to cross-link interference (CLI) reporting upon failure of a master cell group (MCG) or secondary cell group (SCG).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

As described in Third Generation Partnership Project (3GPP) Technical Reference (TR) 38.802, new radio (NR) supports flexible uplink/downlink transmission directions in both paired and unpaired spectrum. Paired spectrum uses a dedicated frequency for downlink and for uplink (typically frequency division duplex (FDD)). Unpaired spectrum uses a single carrier frequency for downlink and uplink (typically time division duplex (TDD)).

NR supports paired and unpaired spectrum and strives to maximize commonality between the technical solutions, allowing FDD operation on a paired spectrum, different transmission directions in either part of a paired spectrum, TDD operation on an unpaired spectrum where the transmission direction of time resources is not dynamically changed, and TDD operation on an unpaired spectrum where the transmission direction of most time resources can be dynamically changing. Downlink and uplink transmission directions, at least for data, can be dynamically assigned on a per-slot basis at least in a time division multiplexing (TDM) manner. Transmission directions include all of downlink, uplink, sidelink, and backhaul link. NR supports at least semi-statically assigned downlink/uplink transmission directions as gNB operation, i.e., the assigned downlink/uplink transmission direction can be signaled to user equipment (UE) by higher layer signaling.

The flexible design in NR facilitates orthogonal frequency division multiplexing (OFDM) symbols in a slot to be classified as downlink, flexible, or uplink. This effectively means that downlink transmission can only occur in symbols classified as downlink or flexible, and uplink transmission can only occur in symbols classified as uplink or flexible. Table 1 below shows the defined slot formats in subclause 11.1 of TS 38.213 v15.5.0 that can be used, in combination with radio resource control (RRC) signaling, to inform the transmission direction in OFDM symbols, valid for one or more slots.

TABLE 1

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |

TABLE 1-continued

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on TDD-UL-DL-ConfigurationCommon, or TDD-UL-DL-ConfigDedicated and, if any, on detected downlink control information (DCI) formats | | | | | | | | | | | | | |

Slot formats for normal cyclic prefix (D-downlink, U-uplink, F-flexible)

With the flexible slot format described above, a scheduler may dynamically determine the transmission direction, called dynamic TDD. Despite the "dynamic TDD" name, it can be applied to half-duplex FDD as well (or even full-duplex operation, although in this case there may be limited need to coordinate uplink and downlink scheduling decisions). This provides NR with a flexible framework that can cope with rapid traffic variations, e.g., during periods of high downlink data transmission, most of the slots could be defined as downlink to accommodate those transmissions.

In this context, TDD configurations between neighboring cells can be misaligned, resulting in what is referred to as cross-link interference (CLI). In other words, CLI exists when neighboring cells use different transmission directions on the same or partially-overlapping time-frequency resources. An example is illustrated in FIG. 1.

FIG. 1 is a timing diagram illustrating an example of cross-link interference. The horizontal axis represents the time domain for two networks, Network A and Network B, where each symbol is scheduled as either a downlink symbol or an uplink symbol. The fourth symbol in Network A is scheduled as a downlink symbol and the fourth symbol in Network B is scheduled as an uplink symbol (indicated by dashed lines). Thus, CLI may occur in symbol 4. Symbol 6 is similar except that Network A is scheduled for uplink and Network B is scheduled for downlink, which may also result in CLI.

In general, CLI may occur in at least two cases. In a first case (downlink degradation to a UE using the same resource allocated in the uplink of a neighbor transmission/reception point (TRP)), a UE-1 is connected to a TRP-A (e.g., a cell A) and is using a resource-X for its uplink transmissions, while another TRP-B (e.g., cell-B) is using that same resource for the downlink of a UE-2 connected to it. Then, UE-2 connected to TRP-B will suffer interference in its downlink caused by the uplink transmissions of UE-1 to TRP-A causing downlink degradation to UE-2 and increasing the chances of a failure due to an increased signal to interference and noise ratio (SINR) due to CLI. In a second case, there is an uplink degradation to a UE, i.e., the problem is in the uplink of the UE-1, which receives interference from UE-2 (whose downlink transmissions are on the same resources).

Because the transmission power of a TRP for downlink transmissions is larger than the power of a UE uplink transmissions, the interference caused by the downlink of TRP-B in the UE's uplink transmissions to TRP-A (first case of uplink degradation) may be considered more critical than the case where the downlink of UE-2 connected to TRP-B is interfered with by the uplink of UE-1.

FIG. 2 is a network diagram illustrating an example cross-link interference scenario. The illustrated example includes a scheduled transmission on the same or partially-overlapping time-frequency resources. For example, UE1 is scheduled for uplink in Cell A, and UE2 is scheduled for downlink in Cell B. The downlink from Cell B may be a source of interference for the uplink reception scheduled in Cell A, called TRP-to-TRP CLI (or DL-to-UL interference). Moreover, the uplink of UE1 can cause significant degradation in downlink reception for UE2, called UE-to-UE CLI (or UL-to-DL interference).

To mitigate CLI, TR 38.802 explores techniques for both TRP-to-TRP and UE-to-UE CLI. Some of the techniques are based on CLI measurements performed in the UE to assist the network to identify the problem. The current RRC specifications define a measurement configuration framework where the UE is configured (e.g., measConfig of information element (IE) MeasConfig included in an RRCReconfiguration message) to perform CLI measurements and report them back to the network in a MeasurementReport message.

CLI measurements can be configured for NR cells in all multi-radio dual connectivity (MR-DC) options. In E-UTRAN NR dual connectivity (EN-DC) and NGRAN E-UTRAN NR DC (NGEN-DC), only the secondary node (SN) can configure CLI measurements. In NR-E-UTRA DC (NE-DC), only the (MN) can configure CLI measurements. In NR-DC, both the MN and the SN can configure CLI measurements, and the MN informs the SN about the maximum number of CLI measurement resources that can be configured by the SN to ensure that the total number of CLI measurement resources does not exceed the UE capabilities.

The network may configure the UE to report the following measurement information based on sounding reference signal (SRS) resources: measurement results per SRS resource and SRS resource(s) indexes. The network may configure the UE to report the following measurement information based on CLI-received signal strength indicator (RSSI) resources: measurement results per CLI-RSSI resource and CLI-RSSI resource(s) indexes.

For CLI measurements, the network can configure SRS-reference signal received power (RSRP) or CLI-RSSI as a trigger quantity. For CLI measurements, reporting quantities can be only SRS-RSRP or only CLI-RSSI.

Related procedures and ASN.1 aspects for CLI so far are defined as follows:

5.5.3 Performing Measurements 5.5.3.1 General

[ . . . ]

The UE shall:

[ . . . ]

2>if the reportType for the associated reportConfig is di-Periodical or cli-EventTriggered:

3>perform the corresponding measurements associated to CLI measurement resources indicated in the concerned measObjectCLI;

2>perform the evaluation of reporting criteria as specified in 5.5.4.

[ . . . ]

5.5.4 Measurement Report Triggering 5.5.4.1 General

If AS security has been activated successfully, the UE shall:

1>for each measId included in the measIdList within VarMeasConfig:

2>if the corresponding reportConfig includes a reportType set to eventTriggered or periodical:

[ . . . ]

2>else if the corresponding reportConfig includes a reportType set to reportCGI:

[ . . . ]

2>else if the corresponding reportConfig includes a reportType set to reportSFTD:

[ . . . ]

2>else if the corresponding reportConfig includes a reportType set to cli-Periodical or cli-EventTriggered:

3>consider all CLI measurement resources included in the corresponding measObject to be applicable;

[ . . . ]

2> if the reportType is set to cli-EventTriggered and if the entry condition applicable for this event, i.e. the event corresponding with the eventId of the corresponding reportConfig within VarMeasConfig, is fulfilled for one or more applicable CLI measurement resources for all measurements after layer 3 filtering taken during timeToTrigger defined for this event within the VarMeasConfig, while the VarMeasReportList does not include a measurement reporting entry for this measId (a first CLI measurement resource triggers the event):

3> include a measurement reporting entry within the VarMeasReportList for this measId;

3> set the numberOfReportsSent defined within the VarMeasReportList for this measId to 0;

3> include the concerned CLI measurement resource(s) in the cli-TriggeredList defined within the VarMeasReportList for this measId;

3> initiate the measurement reporting procedure, as specified in 5.5.5;

2> else if the reportType is set to cli-EventTriggered and if the entry condition applicable for this event, i.e. the event corresponding with the eventId of the corresponding reportConfig within VarMeasConfig, is fulfilled for one or more CLI measurement resources not included in the cli-TriggeredList for all measurements after layer 3 filtering taken during timeToTrigger defined for this event within the VarMeasConfig (a subsequent CLI measurement resource triggers the event):

3> set the numberOfReportsSent defined within the VarMeasReportList for this measId to 0;

3> include the concerned CLI measurement resource(s) in the cli-TriggeredList defined within the VarMeasReportList for this measId;

3> initiate the measurement reporting procedure, as specified in 5.5.5;

2> else if the reportType is set to cli-EventTriggered and if the leaving condition applicable for this event is fulfilled for one or more of the CLI measurement resources included in the cli-TriggeredList defined within the VarMeasReportList for this measId for all measurements after layer 3 filtering taken during timeToTrigger defined within the VarMeasConfig for this event:

3> remove the concerned CLI measurement resource(s) in the cli-TriggeredList defined within the VarMeasReportList for this measId;

3> if reportOnLeave is set to true for the corresponding reporting configuration:

4> initiate the measurement reporting procedure, as specified in 5.5.5;

3> if the cli-TriggeredList defined within the VarMeasReportList for this measId is empty:

4> remove the measurement reporting entry within the VarMeasReportList for this measId;

4> stop the periodical reporting timer for this measId, if running;

2> if reportType is set to cli-Periodical and if a (first) measurement result is available:

3> include a measurement reporting entry within the VarMeasReportList for this measId;

3> set the numberOfReportsSent defined within the VarMeasReportList for this measId to 0;

3> initiate the measurement reporting procedure, as specified in 5.5.5, immediately after the quantity to be reported becomes available for at least one CLI measurement resource;

2> upon expiry of the periodical reporting timer for this measId:

3> initiate the measurement reporting procedure, as specified in 5.5.5.

[ . . . ]

5.5.4.10 Event I1 (Interference Becomes Higher than Threshold)

The UE shall:

1> consider the entering condition for this event to be satisfied when condition I1-1, as specified below, is fulfilled;

1> consider the leaving condition for this event to be satisfied when condition 11-2, as specified below, is fulfilled.

Inequality I1-1 (Entering Condition)

$$Mi-Hys>Thresh$$

Inequality I1-2 (Leaving Condition)

$$Mi+Hys<Thresh$$

The variables in the formula are defined as follows:

Mi is the measurement result of the interference, not taking into account any offsets.

Hys is the hysteresis parameter for this event (i.e. hysteresis as defined within reportConfigNR for this event).

Thresh is the threshold parameter for this event (i.e. i1-Threshold as defined within reportConfigNR for this event).

Mi, Thresh are expressed in dBm.

Hys is expressed in dB.

[ . . . ]

5.5.5 Measurement Reporting 5.5.5.1 General

FIG. 3 is a flow diagram illustrating measurement reporting. FIG. 3 is a reproduction of FIG. 5.5.5.1-1.

The purpose of this procedure is to transfer measurement results from the UE to the network. The UE shall initiate this procedure only after successful AS security activation.

For the measId for which the measurement reporting procedure was triggered, the UE shall set the measResults within the MeasurementReport message as follows:

1> set the measId to the measurement identity that triggered the measurement reporting;

[ . . . ]

1> if there is at least one applicable CLI measurement resource to report:

2> if the reportType is set to cli-EventTriggered or cli-Periodical:

3> set the measResultCLI to include the most interfering SRS resources or most interfering CLI-RSSI resources up to maxReportCLI in accordance with the following:

4> if the reportType is set to cli-EventTriggered:

5> if trigger quantity is set to srs-RSRP i.e. i1-Threshold is set to srs-RSRP: 6> include the SRS resource included in the cli-TriggeredList as defined within the VarMeasReportList for this measId;

5> if trigger quantity is set to cli-RSSI i.e. i1-Threshold is set to cli-RSSI: 6> include the CLI-RSSI resource included in the cli-TriggeredList as defined within the VarMeasReportList for this measId;

4> else: 5> if reportQuantityCLI is set to srs-rsrp: 6> include the applicable SRS resources for which the new measurement results became available since the last periodical reporting or since 5> the measurement was initiated or reset; 6> include the applicable CLI-RSSI resources for which the new measurement results became available since the last periodical reporting or since the measurement was initiated or reset;

4> for each SRS resource that is included in the measResultCLI: 5> include the srs-ResourceId; 5> set srs-RSRP-Result to include the layer 3 filtered measured results in decreasing order, i.e. the most interfering SRS resource is included first;

4> for each CLI-RSSI resource that is included in the measResultCLI: 5> include the rssi-ResourceId; 5> set cli-RSSI-Result to include the layer 3 filtered measured results in decreasing order, i.e. the most interfering CLI-RSSI resource is included first;

1> increment the numberOfReportsSent as defined within the VarMeasReportList for this measId by 1;

1> stop the periodical reporting timer, if running;

1> if the numberOfReportsSent as defined within the VarMeasReportList for this measId is less than the reportAmount as defined within the corresponding reportConfig for this measId:

2> start the periodical reporting timer with the value of reportInterval as defined within the corresponding reportConfig for this measId;

1> else:

2> if the reportType is set to periodical or ch-Periodical:

3> remove the entry within the VarMeasReportList for this measId;

3> remove this measId from the measIdList within VarMeasConfig;

1> if the UE is in (NG)EN-DC:

2> if SRB3 is configured:

3> submit the MeasurementReport message via SRB3 to lower layers for transmission, upon which the procedure ends;

2> else:

3> submit the MeasurementReport message via the E-UTRA MCG embedded in E-UTRA RRC message ULlnformationTransferMRDC as specified in TS 36.331.

1> else if the UE is in NR-DC:

2> if the measurement configuration that triggered this measurement report is associated with the SCG:

3> if SRB3 is configured:

1>4> submit the MeasurementReport message via SRB3 to lower layers for transmission, upon which the procedure ends;

3> else:

2>4> submit the MeasurementReport message via the NR MCG embedded in NR RRC message ULInformationTransferMRDC as specified in 5.7.2a.3;

2> else:

3> submit the MeasurementReport message via SRB1 to lower layers for transmission, upon which the procedure ends;

1> else:

2> submit the MeasurementReport message to lower layers for transmission, upon which the procedure ends.

[ . . . ]

6.3.2 Radio Resource Control Information Elements

CLI-RSSI-Range

The IE CLI-RSSI-Range specifies the value range used in CLI-RSSI measurements and thresholds. The integer value for CLI-RSSI measurements is according to Table [FFS] in TS 38.133 [14].

CLI-RSSI-Range Information Element

```
-- ASN1START
-- TAG-CLI-RSSI-RANGE-START
CLI-RSSI-Range-r16 : :=            INTEGER (0 . . 76)
-- TAG-CLI-RSSI-RANGE-STOP
-- ASN1STOP
```

MeasObjectCLI

The IE MeasObjectCLI specifies information applicable for SRS-RSRP measurements and/or CLI-RSSI measurements.

MeasObjectCLI Information Element

```
-- ASN1START
-- TAG-MEASOBJECTCLI - START
MeasObjectCLI-r16 : :=                SEQUENCE {
        cli-ResourceConfig-r16                 CLI-ResourceConfig-r16,
     . . .
}
CLI-ResourceConfig-r16 : :=           SEQUENCE {
        srs-ResourceConfig-r16                 SetupRelease { SRS-ResourceListConfigCLI-r16 }
OPTIONAL,           -- Need M
        rssi-ResourceConfig-r16             SetupRelease { RSSI-ResourceListConfigCLI-r16 }
OPTIONAL            -- Need M
}
SRS-ResourceListConfigCLI-r16 : :=    SEQUENCE (SIZE (1 . . maxNrofSRS-Resources-r16) ) OF SRS-
ResourceConfigCLI-r16
RSSI-ResourceListConfigCLI-r16 : :=   SEQUENCE (SIZE (1 . . maxNrofCLI-RSSI-Resources-r16) ) OF
RSSI-ResourceConfigCLI-r16
SRS-ResourceConfigCLI-r16 ::          SEQUENCE {
        srs-Resource-r16                       SRS-Resource,
        srs-SCS-r16                            SubcarrierSpacing,
        . . .
}
RSSI-ResourceConfigCLI-r16 : :        SEQUENCE {
        rssi-ResourceId-r16                 RSSI-ResourceId-r16,
        rssi-SCS-r16                        SubcarrierSpacing,
        startPRB-r16                        INTEGER (0 . . 2169),
        nrofPRBs-r16                        INTEGER (4 . . maxNrofPhysicalResourceBlocksPlus1) ,
        startPosition-r16                   INTEGER (0 . . 13),
        nrofSymbols-r16                     INTEGER (1 . . 14),
        rssi-PeriodicityAndOffset-r16       RSSI-PeriodicityAndOffset-r16,
        . . .
}
RSSI-ResourceId-r16 : :=              INTEGER (0 . . maxNrofCLI-RSSI-Resources-r16-1)
RSSI-PeriodicityAndOffset-r16 : :=    CHOICE {
              s110                                INTEGER (0 .. 9),
        s120                              INTEGER (0 . . 19),
        s140                              INTEGER (0 . . 39),
        s180                              INTEGER (0 . . 79),
        s116                              INTEGER (0 . . 159),
        s1320                             INTEGER (0 . . 319),
        s1640                             INTEGER (0 . . 639),
        . . .
}
-- TAG-MEASOBJECTCLI-STOP
-- ASN1STOP
```

| CLI-ResourceConfig field descriptions |
| --- |
| srs-ResourceConfig<br>SRS resources to be used for CLI measurements.<br>rssi-ResourceConfig<br>CLI-RSSI resources to be used for CLI measurements. |

| MeasObjectCLI field descriptions |
| --- |
| cli-ResourceConfig<br>SRS and/or CLI-RSSI resource configuration for CLI measurement. |

| SRS-ResourceConfigCLI field descriptions |
| --- |
| srs-SCS-r16<br>Subcarrier spacing for SRS. Only the values 15, 30 kHz or 60 kHz (FR1), and 60 or 120 kHz (FR2) are applicable. |

| RSSI-ResourceConfigCLI field descriptions |
| --- |
| nrofPRBs<br>Allowed size of the measurement BW. Only multiples of 4 are allowed. The smallest configurable number is the minimum of 4 and the width of the active DL BWP. If the configured value is larger than the width of the active DL BWP, the UE shall assume that the actual CLI-RSSI resource bandwidth is within the active DL BWP. |
| nrofSymbols<br>Within a slot that is configured for CLI-RSSI measurement (see slotConfiguration), the UE measures the RSSI from startPosition to startPosition + nrofSymbols − 1. The configured CLI-RSSI resource does not exceed the slot boundary of the reference SCS. If the SCS of configured active DL BWP(s) is larger than the reference SCS, network configures startPosition and nrofSymbols such that the configured CLI-RSSI resource not to exceed the slot boundary corresponding to the active BWP SCS. If the reference SCS is larger than SCS of active DL BWP(s), network ensures startPosition and nrofSymbols are integer multiple of reference SCS divided by active BWP SCS. |
| rssi-PeriodicityAndOffset-r16<br>Periodicity and slot offset for this CLI-RSSI resource. All values are in "number of slots". Value sl1 corresponds to a periodicity of 1 slot, value sl2 corresponds to a periodicity of 2 slots, and so on. For each periodicity the corresponding offset is given in number of slots. |
| rssi-scs-r16<br>Reference subcarrier spacing for CLI-RSSI measurement. Only the values 15, 30 kHz or 60 kHz (FR1), and 60 or 120 kHz (FR2) are applicable. |
| startPosition<br>OFDM symbol location of the CLI-RSSI resource within a slot. |
| startPRB<br>Starting PRB index of the measurement bandwidth. For the case where the reference subcarrier spacing is smaller than subcarrier spacing of active DL BWP(s), network configures startPRB and nrofPRBs are as a multiple of active BW SCS divided by reference SCS. |

MeasObjectToAddModList

The IE MeasObjectToAddModList concerns a list of measurement objects to add or modify.

MeasObjectToAddModList Information Element

```
-- ASN1START
-- TAG-MEASOBJECTTOADDMODLIST-START
MeasObjectToAddModList : :=        SEQUENCE
                                   (SIZE (1..maxNrofObjectId) ) OF
MeasObjectToAddMod
MeasObjectToAddMod : :=            SEQUENCE {
    measObjectId                       MeasObjectId,
    measObject                         CHOICE {
        measObjectNR                       MeasObjectNR,
```

-continued

```
        . . . ,
        measObjectEUTRA                    MeasObjectEUTRA,
        measObjectCLI-r16                  MeasObjectCLI-r16
    }
}
-- TAG-MEASOBJECTTOADDMODLIST-STOP
-- ASN1STOP
```

MeasResults

The IE MeasResults covers measured results for intra-frequency, inter-frequency, and inter-RAT mobility.

MeasResults information element

```
-- ASN1START
-- TAG-MEASRESULTS-START
MeasResults = : :=                              SEQUENCE {
measId                                                 MeasId,
  measResultServingMOList                              MeasResultServMOList,
  measResultNeighCells                                 CHOICE {
  measResultListNR                                          MeasResultListNR,
  . . . ,
  measResultListEUTRA                                       MeasResultListEUTRA
  }
OPTIONAL,
  . . . ,
  [ [
  measResultServFreqListEUTRA-SCG                      MeasResultServFreqListEUTRA-SCG
OPTIONAL,
  measResultServFreqListNR-SCG                         MeasResultServFreqListNR-SCG
OPTIONAL,
  measResultSFTD-EUTRA                                 MeasResultSFTD-EUTRA
OPTIONAL,
  measResultSFTD-NR                                    MeasResultCellSFTD-NR
OPTIONAL
      ] ],
  [ [
  measResultCellListSFTD-NR                                 MeasResultCellListSFTD-NR
OPTIONAL
      ] ],
  [ [
  measResultCLI-r16                                    MeasResultCLI-r16
```

```
OPTIONAL
   ] ]
}
MeasResult ServMOList : :=                SEQUENCE (SIZE (1. . maxNrofServingCells) ) OF
MeasResultServMO
MeasResultServMO : :=                     SEQUENCE {
   servCellId                                      ServCellIndex,
   measResultServingCell                           MeasResultNR,
   measResultBestNeighCell                         MeasResultNR
OPTIONAL,
   . . .
}
MeasResultListNR : :=                     SEQUENCE
                                          (SIZE (1. . maxCellReport) ) OF MeasResultNR
MeasResultNR : :=                         SEQUENCE {
   physCellId                                      PhysCellId
OPTIONAL,
   measResult                                      SEQUENCE {
        cellResults                                        SEQUENCE {
                       resultsSSB-Cell                             MeasQuantityResults
OPTIONAL,
                       resultsCSI-RS-Cell                          MeasQuantityResults
OPTIONAL
            },
            rsIndexResults                                 SEQUENCE {
                       resultsSSB-Indexes                        ResultsPerSSB-IndexList
OPTIONAL,
                       resultsCSI-RS-Indexes                     ResultsPerCSI-RS-IndexList
OPTIONAL
         }
OPTIONAL
      },
      . . . ,
      [ [
      cgi-Info                                     CGI-InfoNR
OPTIONAL
      ] ]
}
MeasResultListEUTRA : :=                  SEQUENCE
                                          (SIZE (1. .maxCellReport) ) OF MeasResultEUTRA
MeasResultEUTRA : :=                      SEQUENCE {
      eutra-PhysCellId                             PhysCellId,
      measResult                                   MeasQuantityResults EUTRA,
      cgi-Info                                     CGI-InfoEUTRA
OPTIONAL,
      . . .
}
MultiBandInfoListEUTRA : :=               SEQUENCE (SIZE (1. . maxMultiBands) ) OF
FreqBandIndicatorEUTRA
MeasQuantityResults : :=                  SEQUENCE {
      rsrp                                         RSRP-Range
OPTIONAL,
      rsrq                                         RSRQ-Range
OPTIONAL,
      sinr                                         SINR-Range
OPTIONAL
}
Meas QuantityResultsEUTRA : : =           SEQUENCE {
      rsrp                                         RSRP-RangeEUTRA
OPTIONAL,
      rsrq                                         RSRQ-RangeEUTRA
OPTIONAL,
      sinr                                         SINR-RangeEUTRA
OPTIONAL
}
ResultsPerSSB-IndexList : : =             SEQUENCE (SIZE (1. . maxNrofIndexesToReport2) ) OF
ResultsPerSSB-Index
ResultsPerSSB-Index : : =                 SEQUENCE {
      ssb-Index                                    SSB-Index,
      ssb-Results                                  MeasQuantityResults
OPTIONAL
}
ResultsPerCSI-RS-IndexList : : =          SEQUENCE (SIZE
                                          (1. . maxNrofIndexesToReport2) ) OF
Results PerCSI-RS-Index
ResultsPerCSI-RS-Index : :=               SEQUENCE {
      csi-RS-Index                                 CSI-RS-Index,
      csi-RS-Results                               MeasQuantityResults
OPTIONAL
```

-continued

```
}
MeasResultServFreqListEUTRA-SCG : := SEQUENCE (SIZE (1. . maxNrofServingCellsEUTRA) ) OF
MeasResult2EUTRA
MeasResultServFreqListNR-SCG : : = SEQUENCE (SIZE (1. . maxNrofServingCells) ) OF MeasResult2NR

MeasResultCLI-r16 : :=                      SEQUENCE {
    measResultListSRS-RSRP-r16                    MeasResultListSRS-RSRP-r16
OPTIONAL,
    measResultListCLI-RSSI-r16                  MeasResultListCLI-RSSI-r16
OPTIONAL
}
MeasResultListSRS-RSRP-r16 :=               SEQUENCE
                                            (SIZE (1 .. maxCLI-Report-r16) ) OF
MeasResult SRS-RSRP-r16
MeasResult SRS-RSRP-r16 : :=                SEQUENCE {
    srs-ResourceId-r16                          SRS-ResourceId,
    srs-RSRP-Result-r16                         SRS-RSRP-Range-r16
}
MeasResultListCLI-RSSI-r16 :=               SEQUENCE
                                            (SIZE (1 .. maxCLI-Report-r16) ) OF
MeasResultCLI-RSSI-r16
MeasResultCLI-RSSI-r16 : :=                 SEQUENCE {
    rssi-ResourceId-r16                         RSSI-ResourceId-r16,
    cli-RSSI-Result-r16                         CLI-RSSI-Range-r16
}
-- TAG-MEASRESULTS-STOP
-- ASN1STOP
measResultCLI
CLI measurement results.
```

ReportConfigNR

The IE ReportConfigNR specifies criteria for triggering of an NR measurement reporting event. For events labelled AN with N equal to 1, 2 and so on, measurement reporting events are based on cell measurement results, which can either be derived based on SS/PBCH block or CSI-RS.

Event A1: Serving becomes better than absolute threshold;

Event A2: Serving becomes worse than absolute threshold;

Event A3: Neighbour becomes amount of offset better than PCell/PSCell;

Event A4: Neighbour becomes better than absolute threshold;

Event A5: PCell/PSCell becomes worse than absolute thresholdl AND Neighbour/SCell becomes better than another absolute threshold2;

Event A6: Neighbour becomes amount of offset better than SCell.

For event I1, measurement reporting event is based on CLI measurement results, which can either be derived based on SRS-RSRP or CLI-RSSI.

Event I1: Interference becomes higher than absolute threshold.

ReportConfigNR information element

```
-- ASN1START
-- TAG-REPORTCONFIGNR-START
ReportConfigNR : :=                                               SEQUENCE {
        reportType                                                    CHOICE {
                periodical                                                PeriodicalReportConfig,
                eventTriggered                                            EventTriggerConfig,
                . . . ,
                reportCGI                                                 ReportCGI,
                reportSFTD                                                ReportSFTD-NR,
                cli-Periodical-r16                                        CLI-PeriodicalReportConfig-r16,
                cli-EventTriggered-r16                                    CLI-EventTriggerConfig-r16
        }
}
ReportCGI : :=                          SEQUENCE {
        cellForWhichToReportCGI             Phys CellId,
                . . .
}
ReportSFTD-NR : :=                      SEQUENCE {
        report SFTD-Meas                    BOOLEAN,
        reportRSRP                          BOOLEAN,
        . . . ,
        [ [
        reportSFTD-NeighMeas                ENUMERATED {true}
OPTIONAL, -- Need R
        drx-SFTD-NeighMeas                  ENUMERATED {true}
OPTIONAL, -- Need R
cellsForWhichToReportSFTD                   SEQUENCE (SIZE (1. . maxCellSFTD) ) OF PhysCellId OPTIONAL
-- Need R
        ] ]
}
```

-continued

```
EventTriggerConfig: :=                    SEQUENCE {
    eventId                                         CHOICE {
        eventA1                                         SEQUENCE {
            al-Threshold                                    MeasTriggerQuantity,
            reportOnLeave                                   BOOLEAN,
            hysteresis                                      Hysteresis,
            timeToTrigger                                   TimeToTrigger
        },
        eventA2                                         SEQUENCE {
            a2-Threshold                                    MeasTriggerQuantity,
            reportOnLeave                                   BOOLEAN,
            hysteresis                                      Hysteresis,
            timeToTrigger                                   TimeToTrigger

        eventA3                                         SEQUENCE {
            a3-Offset                                       MeasTriggerQuantityOffset,
            reportOnLeave                                   BOOLEAN,
            hysteresis                                      Hysteresis,
            timeToTrigger                                   TimeToTrigger,
            useWhiteCellList                                BOOLEAN
        } ,
        eventA4                                         SEQUENCE {
            a4-Threshold                                    MeasTriggerQuantity,
            reportOnLeave                                   BOOLEAN,
            hysteresis                                      Hysteresis,
            timeToTrigger                                   TimeToTrigger,
            useWhiteCellList                                BOOLEAN,
        },
        eventA5                                         SEQUENCE {
            a5-Threshold1                                   MeasTriggerQuantity,
            a5-Threshold2                                   MeasTriggerQuantity,
            reportOnLeave                                   BOOLEAN
            hysteresis                                      Hysteresis,
            timeToTrigger                                   TimeToTrigger,
            useWhiteCellList                                BOOLEAN,
        },
        eventA6                                         SEQUENCE {
            a6-Offset                                       MeasTriggerQuantityOffset,
            reportOnLeave                                   BOOLEAN
            hysteresis                                      Hysteresis,
            timeToTrigger                                   TimeToTrigger,
            useWhiteCellList                                BOOLEAN
        },
        . . .
    },
    rsType                                          NR-RS-Type,
    report Interval                                 ReportInterval,
    reportAmount                                    ENUMERATED
                                                    {r1,r2,r4, r8, r16, r32, r64,
infinity},
    reportQuantityCell                                  MeasReportQuantity,
    maxReportCells                                  INTEGER (1. . maxCellReport) ,
    reportQuantityRS-Indexes                        Meas ReportQuantity
OPTIONAL, -- Need R
    maxNrofRS-IndexesToReport                       INTEGER
                                                    (1. . maxNrofIndexesToReport)
OPTIONAL, -- Need R
    includeBeamMeasurements                         BOOLEAN,
    reportAddNeighMeas                              ENUMERATED { setup}
OPTIONAL, -- Need R
    . . .
}
PeriodicalReportConfig : :=                     SEQUENCE {
    rsType                                          NR-RS-Type,
    report Interval                                 ReportInterval,
    reportAmount                                    ENUMERATED
                                                    {r1, r2, r4, r8, r16, r32, r64,
infinity},
    reportQuantityCell                              MeasReportQuantity,
    maxReportCells                                  INTEGER (1. . maxCellReport),
    reportQuantityRS-Indexes                        MeasReportQuantity
OPTIONAL, -- Need R
    maxNrofRS-IndexesToReport                       INTEGER (1. . maxNrofIndexesToReport)

OPTIONAL, -- Need R
    includeBeamMeasurements                         BOOLEAN,
    useWhiteCellList                                BOOLEAN,
    . . .
}
```

-continued

```
NR-RS-Type : :=                                         ENUMERATED { ssb, csi-rs}
MeasTriggerQuantity : :=                                CHOICE {
        rsrp                                                    RSRP-Range,
        rsrq                                                    RSRQ-Range,
        sinr                                                    SINR-Range
}
MeasTriggerQuantityOffset : : =                         CHOICE {
        rsrp                                                    INTEGER (-30 .. 30),
        rsrq                                                    INTEGER (-30 .. 30) ,
        sinr                                                    INTEGER (-30 .. 30)
}
Meas ReportQuantity : :=                              SEQUENCE {
        rsrp                                                    BOOLEAN,
        rsrq                                                    BOOLEAN,
        sinr                                                    BOOLEAN
}
CLI-EventTriggerConfig-r16                            SEQUENCE {
                eventId-r16                                     CHOICE {
                        eventI1-r16                                     SEQUENCE {
                                il-Threshold-r16                                MeasTriggerQuantityCLI-r16,
                                reportOnLeave-r16                               BOOLEAN,
                                hysteresis-r16                                  Hysteresis,
                                timeToTrigger-r16                               TimeToTrigger
        },
                . . .
        },
        reportInterval-r16                                      ReportInterval,
        reportAmount-r16                                        ENUMERATED {r1, r2, r4, r8, r16, r32, r64,
infinity},
        maxReportCLI-r16                                        INTEGER (1. . maxCLI-Report-r16) ,
        . . .
}
CLI-PeriodicalReportConfig-r16 : :=                     SEQUENCE {
        reportInterval-r16                                      ReportInterval,
        reportAmount-r16                                        ENUMERATED
                                                                {r1, r2, r4, r8, r16, r32, r64,
infinity} ,
        reportQuantityCLI-r16                                   MeasReportQuantityCLI-r16,
        maxReportCLI-r16                                        INTEGER (1. . maxCLI-Report-r16) ,
        . . .
}
MeasTriggerQuantityCLI-r16 : :=                         CHOICE {
        srs-RSRP-r16                                            SRS-RSRP-Range-r16,
        cli-RSSI-r16                                            CLI-RSSI-Range-r16
}
Meas ReportQuantityCLI-r16 : :=                         ENUMERATED { srs-rsrp, cli-rssi}
-- TAG-REPORTCONFIGNR-STOP
-- ASN1STOP
****************************************************************************************************************
```

When a UE operates in multi-radio dual connectivity (MR-DC), radio link failure (RLF) may occur in the link the UE is connected to a master cell group (MCG), which is referred to as M-RLF or MCG RLF, or in the link connected to a secondary cell group (SCG), which is referred to as S-RLF or SCG RLF. In TS 38.331, SCG RLF determination and actions upon determination are defined as follows:

5.3.10.3 Detection of radio link failure

The UE shall:

[ . . . ]

The UE shall:

1> upon T310 expiry in PSCell; or

1> upon random access problem indication from SCG MAC; or

1> upon indication from SCG RLC that the maximum number of retransmissions has been reached:

2> if the indication is from SCG RLC and CA duplication is configured and activated; and for the corresponding logical channel allowedServingCells only includes SCell(s):

3> initiate the failure information procedure as specified in 5.7.5 to report RLC failure.

2> else:

3> consider radio link failure to be detected for the SCG, i.e. SCG RLF;

3> initiate the SCG failure information procedure as specified in 5.7.3 to report SCG radio link failure.

As described in the excerpt above, the UE considers an SCG RLF to be detected if T310 expires in the PSCell (due to radio link problems), when random access problems are indicated from the SCG medium access control (MAC) (e.g., when a maximum number of preamble transmission attempts is reached), or when SCG radio link control (RLC) indicates that the maximum number of retransmissions has been reached. All these issues may occur due to an increase in the interference of the secondary link.

When the procedure has been initiated, the UE shall stop all transmissions to the SCG and instead trigger a SCGFailureInformation message, which contains potential information regarding the failure. While some failures might be related to things such as failure to configure a certain configuration, some failures are more due to a weak radio condition. L3 measurements based on synchronization signal block (SSB) and channel state information reference signal (CSI-RS), if available, according to 5.5 in TS 38.331 configured via measConfig, may be included to indicate to the network potential good candidate cells that were not selected for SCG change, for example. To this end, the UE includes in its failure report L3 NR measurements as in VarMeasReportList, as configured by the MCG in (NG)EN-DC, NE-DC and NR-DC, or as configured by the SCG in (NG)EN-DC and NR-DC.

The master cell group failure information feature is used to inform E-UTRAN or NR MN about an MCG failure the UE has experienced, i.e., MCG radio link failure. To this end, the UE includes in its MCG failure report L3 NR measurements configured by the MCG in (NG)EN-DC, NE-DC and NR-DC, or as configured by the SCG, in (NG)EN-DC and NR-DC.

There currently exist certain challenges. For example, as described above, CLI measurements should be supported for NR cells in all MR-DC options and NR carrier aggregation (CA). Thus, in one case an MCG may have detected a potential issue in its downlink and/or uplink that could be caused by CLI and configures the UE to perform CLI measurements. Meanwhile, the MCG link gets so degraded that an MCG RLF occurs while the UE has not reported any CLI measurements. It could be that the CLI was the source of the MCG RLF.

In another case, an SCG may have detected a potential issue in its downlink and/or uplink that could be caused by CLI and configures the UE to perform CLI measurements. Meanwhile, the SCG link gets so degraded that an SCG RLF occurs while the UE has not reported any CLI measurements. However, even if the CLI conditions above happen, the UE is not able to report CLI measurements in its SCG failure report, or MCG failure report in case of MCG failure framework.

SUMMARY

Based on the description above, certain challenges currently exist with cross-link interference (CLI) reporting. Certain aspects of the present disclosure and their embodiments may provide solutions to these or other challenges.

Particular embodiments include CLI measurements in the failure indication message for master cell group (MCG) and secondary cell group (SCG) failure indication. More specifically, certain embodiments relate to a method at a wireless device/terminal (also referred to as a user equipment (UE)) operating in multi-radio dual connectivity (MR-DC) for reporting CLI measurements. The method comprises, for SCG failure, receiving a measurement configuration indicating that the UE shall perform CLI measurements. This may comprise the monitoring of events associated to the triggering of CLI measurement reports and transmissions of these reports when an entry condition is fulfilled. In some embodiments, CLI measurement has been configured by the Secondary Node (SN), i.e., considered as part of the SN related measConfig (possibly stored in a separate UE variable for VarMeasConfig). In some embodiments, CLI measurement has been configured by the master node (MN), i.e., considered as part of the MN related measConfig (possibly stored in a separate UE variable for VarMeasConfig). In some embodiments the configuration may be received in a measConfig field of information element (IE) MeasConfig within an RRCReconfiguration or RRCResume message.

The method may also include detecting a radio link failure (RLF) associated to the SCG. This may be done according to at least one of the criterion as defined in TS 38.331, in 5.3.10.3 for the SN (e.g., for the PSCell, which is the cell the UE is connected to the SN) such as (a) expiry of timer T310 in PSCell; (b) upon random access problem indication from SCG medium access control (MAC); or (c) upon indication from SCG radio link control (RLC) that the maximum number of retransmissions has been reached.

The method may further include determining that CLI measurements are available. The method may additionally include providing CLI measurement information in the SCG failure report under certain conditions. The method may additionally include transmitting (e.g., to the MN) an SCG Failure message including CLI measurement information.

Some embodiments disclosed herein include a method at a wireless device/terminal (also referred to as a UE) operating in MR-DC for reporting CLI measurements. The method comprises, for MCG failure, receiving a measurement configuration indicating that the UE shall perform CLI measurements. This may include the monitoring of events associated to the triggering of CLI measurement reports and transmissions of these reports when an entry condition is fulfilled. In some embodiments, CLI measurement has been configured by the SN, i.e., considered as part of the SN related measConfig (possibly stored in a separate UE variable for VarMeasConfig). In some embodiments, CLI measurement has been configured by the MN, i.e., considered as part of the MN related measConfig (possibly stored in a separate UE variable for VarMeasConfig). The configuration may be received in a measConfig field of IE MeasConfig within an RRCReconfiguration or RRCResume message.

The method may further include detecting a RLF associated to the MCG. This may be done according to at least one of the criterion as defined in TS 38.331, in 5.3.10.3 for the MN (e.g., for the PCell, which is the cell the UE is connected to the MN) such as: (a) expiry of timer T310 in PCell; (b) upon random access problem indication from MCG MAC; or (c) upon indication from MCG RLC that the maximum number of retransmissions has been reached.

The method may further include determining that CLI measurements are available. The method may additionally include providing CLI measurement information in the MCG failure report under certain conditions. The method may further include transmitting (e.g., to the SN) an MCG Failure message including CLI measurement information.

Some embodiments disclosed herein include a method at a first network node (also referred to as a gNodeB (gNB)) operating in MR-DC as a SN for a given UE, for handling CLI. The method includes, for SCG failure, transmitting a measurement configuration indicating that the UE shall perform CLI measurements. In some embodiments, CLI measurement is configured by the SN, i.e., considered as part of the SN related measConfig (possibly stored in a separate UE variable for VarMeasConfig). The configuration may be transmitted in a measConfig field of IE MeasConfig within an RRCReconfiguration or RRCResume message. The method also includes receiving from a second network node (e.g., MN) information indicating that an SCG failure occurred, the report including CLI measurements performed by a UE.

Some embodiments disclosed herein include a method at a second network node (also referred to as a gNB) operating in MR-DC as a MN for a given UE, for handling CLI. The method includes, for SCG failure, receiving from a UE an SCG Failure message including CLI measurement information. The method additionally includes determining information related to a first network node (e.g., SN), such as addressing information. The method also includes transmitting to the first network node (e.g., SN) information indicating that an SCG failure occurred, the report including CLI measurements performed by a UE.

Some embodiments disclosed herein include a method at a first network node (also referred to as a gNB) operating in MR-DC as a SN for a given UE, for handling CLI. The method includes, for MCG failure, receiving from a UE an MCG Failure message including CLI measurement information. The method also includes determining information related to a second network node (e.g., MN), such as addressing information. The method further includes transmitting to the second network node (e.g., MN) information indicating that an MCG failure occurred. The report may include CLI measurements performed by a UE.

Some embodiments disclosed herein include a method at a second network node (also referred to as a gNB) operating in MR-DC as a MN for a given UE, for handling CLI. The method includes, for MCG failure, transmitting a measurement configuration indicating that the UE shall perform CLI measurements. In some embodiments, the CLI is configured by the SN, i.e., considered as part of the SN related measConfig (possibly stored in a separate UE variable for VarMeasConfig). The configuration may be transmitted in a measConfig field of IE MeasConfig within an RRCReconfiguration or RRCResume message. The method also includes receiving from a first network node (e.g., SN) information indicating that an MCG failure occurred, the report including CLI measurements performed by a UE.

The particular embodiments described above may be generalized as follows. According to some embodiments, a method performed by a wireless device capable of operating in dual connectivity with a first network node in a first cell group and a second network node in a second cell group comprises: receiving a measurement configuration message that includes an indication to perform CLI measurements; detecting RLF with the first cell group; determining that CLI measurements are available; including CLI measurement information in a first cell group failure report; and transmitting the first cell group failure report to the second network node.

In particular embodiments, the measurement configuration is received from the first network node or the second network node. The measurement configuration may be received in a MeasConfig within a RRCReconfiguration or RRCResume message.

In particular embodiments, detecting the RLF comprises detecting one or more of a timer expiration, random access problem, or an indication from the radio link control layer that a maximum number of retransmissions has been reached. The CLI measurement information may only be included in the first cell group failure report when the RLF is based on one or more of a timer expiration, random access problem, or an indication from the radio link control layer that a maximum number of retransmissions has been reached.

In particular embodiments, the CLI measurement information included in the first cell group failure report is less than an amount of information configured for RRM.

In particular embodiments, the first network node comprises a master node, the first cell group comprises a MCG, the second network node comprises a secondary node, and the second cell group comprises a SCG. In other embodiments, the first network node comprises a secondary node, the first cell group comprises a SCG, the second network node comprises a master node, and the second cell group comprises a MCG. According to some embodiments, a wireless device comprises processing circuitry operable to perform any of the wireless device methods described above.

Also disclosed is a computer program product comprising a non-transitory computer readable medium storing computer readable program code, the computer readable program code operable, when executed by processing circuitry to perform any of the methods performed by the wireless device described above.

According to some embodiments, a method performed by a first network node in a first cell group operating in dual connectivity with a wireless device comprises: transmitting to the wireless device a measurement configuration message that includes an indication for the wireless device to perform CLI measurements; and receiving from a second network node in a second cell group that an indication that a radio link failure occurred between the wireless device and the first cell group and CLI measurement information.

In particular embodiments, the measurement configuration is transmitted in a MeasConfig within a RRCReconfiguration or RRCResume message. The measurement configuration may include an indication of one or more conditions under which the wireless device should report CLI measurements. At least one of the one or more conditions comprises a failure that relates to radio conditions. For example, at least one of the one or more conditions may comprise one or more of a timer expiration, random access problem, or an indication from the radio link control layer that a maximum number of retransmissions has been reached.

In particular embodiments, the CLI measurement information is less than an amount of information configured for RRM.

In particular embodiments, the first network node comprises a master node, the first cell group comprises a MCG, the second network node comprises a secondary node, and the second cell group comprises a SCG. In other embodiments, the first network node comprises a secondary node, the first cell group comprises a SCG, the second network node comprises a master node, and the second cell group comprises a MCG.

According to some embodiments, a method performed by a first network node in a first cell group operating in dual connectivity with a wireless device comprises receiving from the wireless device a second cell group failure report. The second cell group failure report includes CLI measurement information. The method further comprises determining the second cell group failure report is associated with a second network node in the second cell group and transmitting to the second network node an indication that a radio link failure occurred between the wireless device and the second cell group and the CLI measurement information.

In particular embodiments, the first network node comprises a master node, the first cell group comprises a MCG, the second network node comprises a secondary node, and the second cell group comprises a SCG. In other embodiments, the first network node comprises a secondary node, the first cell group comprises a SCG, the second network node comprises a master node, and the second cell group comprises a MCG.

According to some embodiments, a network node comprises processing circuitry operable to perform any of the network node methods described above. Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantages. For example, a UE may include CLI measurement reports even in failure cases leveraging the fact that the UE is operating in MR-DC. Thus, the network gets a full understanding of the radio conditions that causes the SCG failure and/or the MCG failure and speeds up the UE recovery for accessing both nodes for MR-DC.

BRIEF DESCRIPTION OF THE DRAWINGS

For a more complete understanding of the disclosed embodiments and their features and advantages, reference is now made to the following description, taken in conjunction with the accompanying drawings, in which:

FIG. 11 is flowchart illustrating an example method in a first network node, according to certain embodiments;

FIG. 12 is flowchart illustrating another example method in a first network node, according to certain embodiments;

DETAILED DESCRIPTION

Figure 1:
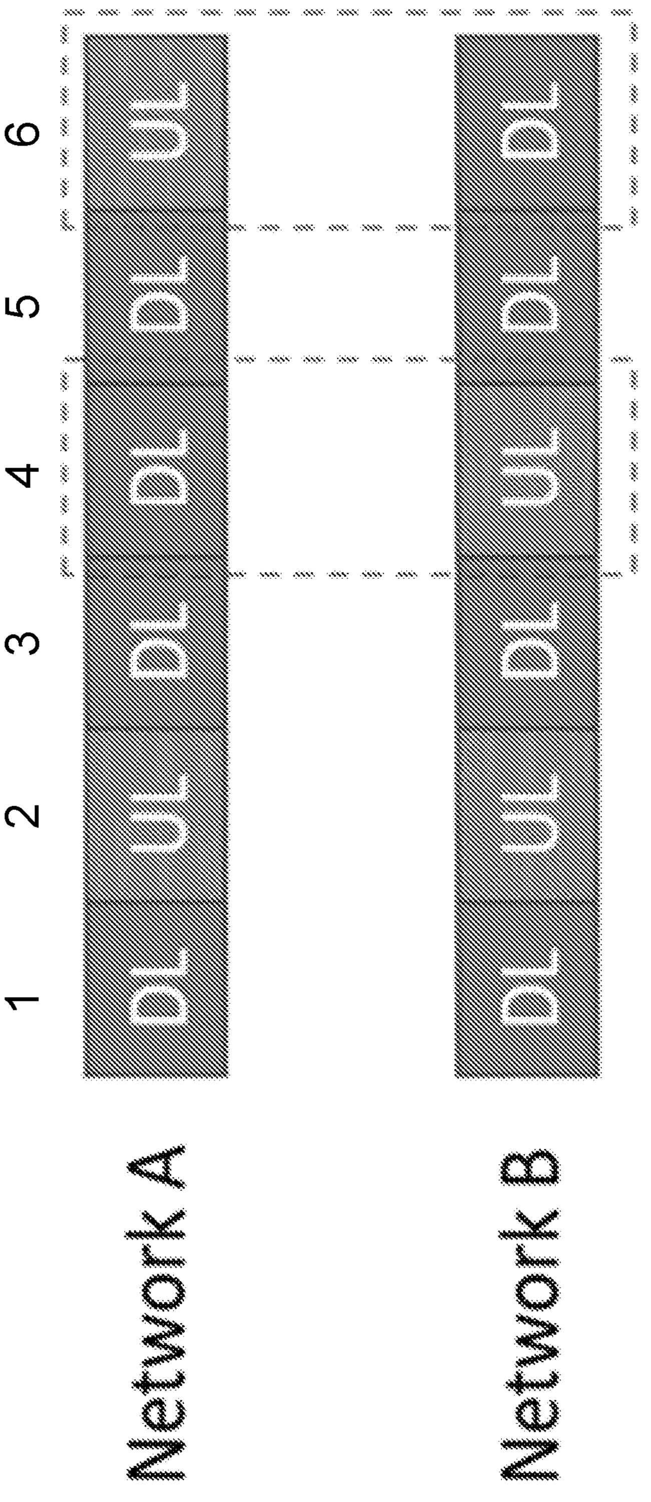
FIG. 1 is a timing diagram illustrating an example of cross-link interference.
Figure 2:
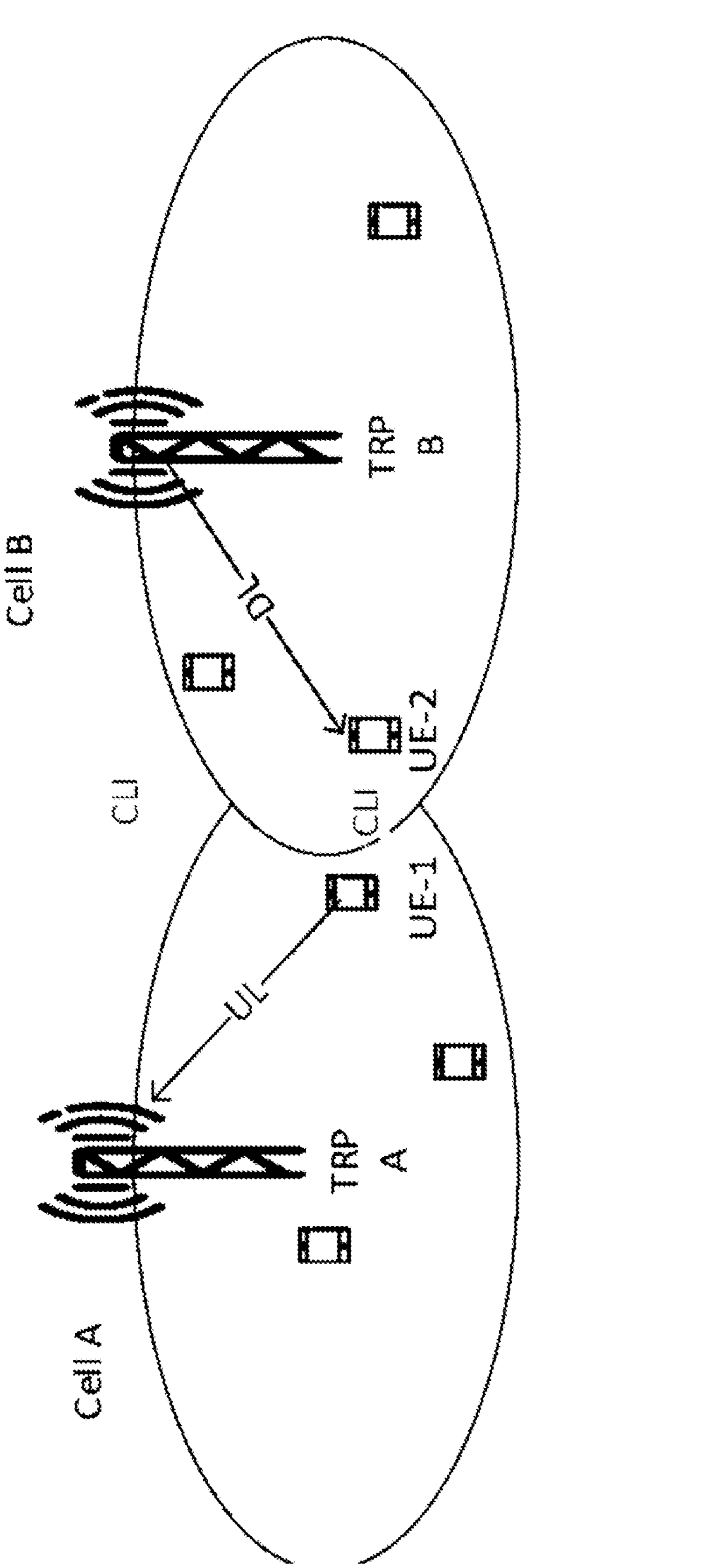
FIG. 2 is a network diagram illustrating an example cross-link interference scenario.
Figure 3:
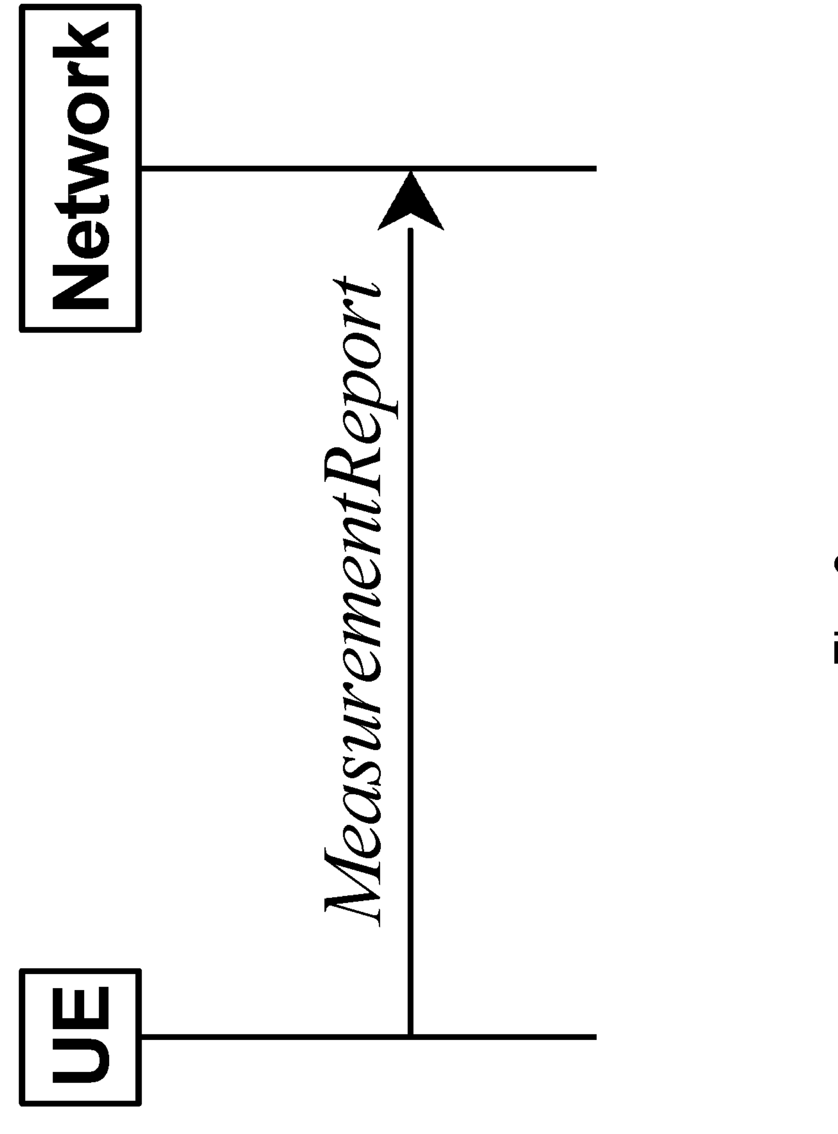
FIG. 3 is a flow diagram illustrating measurement reporting.

As described above, certain challenges currently exist with synchronization and random access during connection resume when operating in dual connectivity. Certain aspects of the present disclosure and their embodiments may provide solutions to these or other challenges.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Some embodiments include methods at a UE. For example, some embodiments include a wireless device/terminal (also referred to as a user equipment (UE)) operating in multi-radio dual connectivity (MR-DC) for reporting cross-link interference (CLI) measurements. For secondary cell group (SCG) failure, in some embodiments, the UE receives a measurement configuration indicating that the UE shall perform CLI measurements.

The configuration may comprise the monitoring of events associated to the triggering of CLI measurement reports and transmissions of the reports when an entry condition is fulfilled. In some embodiments, CLI measurements are configured by the secondary node (SN), i.e., considered as part of the SN related measConfig (possibly stored in a separate UE variable for VarMeasConfig). In some embodiments, CLI measurements are configured by the master node (MN), i.e. considered as part of the MN related measConfig (possibly stored in a separate UE variable for VarMeasConfig). The configuration may be received in a measConfig field of the information element (IE) MeasConfig within an RRCReconfiguration or RRCResume message.

In some embodiments, the UE detects a radio link failure (RLF) associated to the SCG. The detection may be done according to at least one of the criterion as defined in TS 38.331, in 5.3.10.3 for the SN (e.g., for the PSCell, which is the cell the UE is connected to the SN) such as: (a) expiry of timer T310 in PSCell; (b) upon random access problem indication from SCG MAC; or (c) upon indication from SCG RLC that the maximum number of retransmissions has been reached.

In some embodiments, the UE determines that CLI measurements are available. The UE includes CLI measurement information in the SCG failure report under certain conditions. For example, to enable more granular support, the UE may only send the CLI measurement report to the MN if SCG failure is due a certain set of reasons such as: (a) expiry of timer T310 in PSCell; (b) upon random access problem indication from SCG MAC; or (c) upon indication from SCG RLC that the maximum number of retransmissions has been reached.

In some embodiments, the reporting configuration will instruct the UE to include a smaller amount of resources when sending the measurements to MN or SN compared to the RRM-configuration.

In some embodiments, the UE transmits (e.g., to the master node) an SCG Failure message including CLI measurement information.

Similar actions may be performed for MCG failure. For example, in some embodiments the UE receives a measurement configuration indicating that the UE shall perform CLI measurements.

The configuration may comprise the monitoring of events associated to the triggering of CLI measurement reports and transmissions of the reports when an entry condition is fulfilled. In some embodiments, CLI measurements are configured by the SN, i.e., considered as part of the SN related measConfig (possibly stored in a separate UE variable for VarMeasConfig). In some embodiments, CLI measurements are configured by the MN, i.e. considered as part of the MN related measConfig (possibly stored in a separate UE variable for VarMeasConfig). The configuration may be received in a measConfig field of the IE MeasConfig within an RRCReconfiguration or RRCResume message.

In some embodiments, the UE detects a RLF associated to the MCG. The detection may be done according to at least one of the criterion as defined in TS 38.331, in 5.3.10.3 for the MN (e.g., for the PCell, which is the cell the UE is connected to the SN) such as: (a) expiry of timer T310 in PCell; (b) upon random access problem indication from MCG MAC; or (c) upon indication from MCG RLC that the maximum number of retransmissions has been reached.

In some embodiments, the UE determines that CLI measurements are available. The UE includes CLI measurement information in the MCG failure report under certain conditions. For example, to enable more granular support, the UE may only send the CLI measurement report to the SN if MCG failure is due a certain set of reasons such as: (a) expiry of timer T310 in PCell; (b) upon random access problem indication from MCG MAC; or (c) upon indication from MCG RLC that the maximum number of retransmissions has been reached.

In some embodiments, the reporting configuration will instruct the UE to include a smaller amount of resources when sending the measurements to MN or SN compared to the RRM-configuration.

In some embodiments, the UE transmits (e.g., to the secondary node) an MCG Failure message including CLI measurement information. Some embodiments include methods at a gNB. For example, in some embodiments, a first network node (also referred to as a gNB) operates in MR-DC as a SN for a given UE for handling CLI. For SCG failure, in some embodiments, the first network transmits a measurement configuration indicating that the UE shall perform CLI measurements.

In some embodiments, CLI measurement is configured by the SN, i.e. considered as part of the SN related measConfig (possibly stored in a separate UE variable for VarMeasConfig). The configuration may be transmitted in a measConfig field of IE MeasConfig within an RRCReconfiguration or RRCResume message.

In some embodiments, to enable more granular support, the configuration includes an indication under which conditions that a UE should include CLI measurements. The conditions may include failures that relate to radio conditions as opposed to some other failure reasons where the cause of the failure is not related to the radio conditions. The reasons for including the CLI measurements may include: (a) expiry of timer T310 in PSCell; (b) upon random access problem indication from SCG MAC; or (c) upon indication from SCG RLC that the maximum number of retransmissions has been reached.

In some embodiments, the reporting configuration to be used for RRM may be different and may include a smaller amount of resources to report where only the strongest resources are reported.

In some embodiments, the first network node receives from a second network node (e.g., MN) information indicating that an SCG failure occurred, the report including CLI measurements performed by a UE.

In some embodiments, a second network node (also referred to as a gNB) operates in MR-DC as a MN for a given UE for handling CLI. For SCG failure, the second network node receives from a UE an SCG Failure message including CLI measurement information. The second network node determines information related to a first network node (e.g., SN), such as addressing information and transmits to the first network node (e.g., SN) information indicating that an SCG failure occurred, the report including CLI measurements performed by a UE.

In some embodiments, a first network node (also referred to as a gNB) operates in MR-DC as a SN for a given UE for handling CLI. For MCG failure, the first network node receives from a UE an MCG Failure message including CLI measurement information. The first network node determines information related to a second network node (e.g., MN), such as addressing information and transmits to the second network node (e.g., MN) information indicating that an MCG failure occurred, the report including CLI measurements performed by a UE.

In some embodiments, a second network node (also referred to as a gNB) operates in MR-DC as a MN for a given UE for handling CLI. For MCG failure, the second network node transmits a measurement configuration indicating that the UE shall perform CLI measurements.

In some embodiments, the CLI measurement is configured by the SN, i.e. considered as part of the SN related measConfig (possibly stored in a separate UE variable for VarMeasConfig). The configuration may be transmitted in a measConfig field of IE MeasConfig within an RRCReconfiguration or RRCResume message.

In some embodiments, to enable more granular support, the configuration includes an indication under which conditions that a UE should include CLI measurements. The conditions may include failures that relate to radio conditions as opposed some other failure reasons where the cause of the failure is not related to the radio conditions. The reasons for including the CLI measurements may include: (a) expiry of timer T310 in PCell; (b) upon random access problem indication from MCG MAC; or (c) upon indication from MCG RLC that the maximum number of retransmissions has been reached.

In some embodiments, the reporting configuration to be used for RRM may be different and may include a smaller amount of resources to report where only the strongest resources are reported.

In some embodiments, the second network node receives from a first network node (e.g., SN) information indicating that an MCG failure occurred, the report including CLI measurements performed by a UE.

Figure 4:
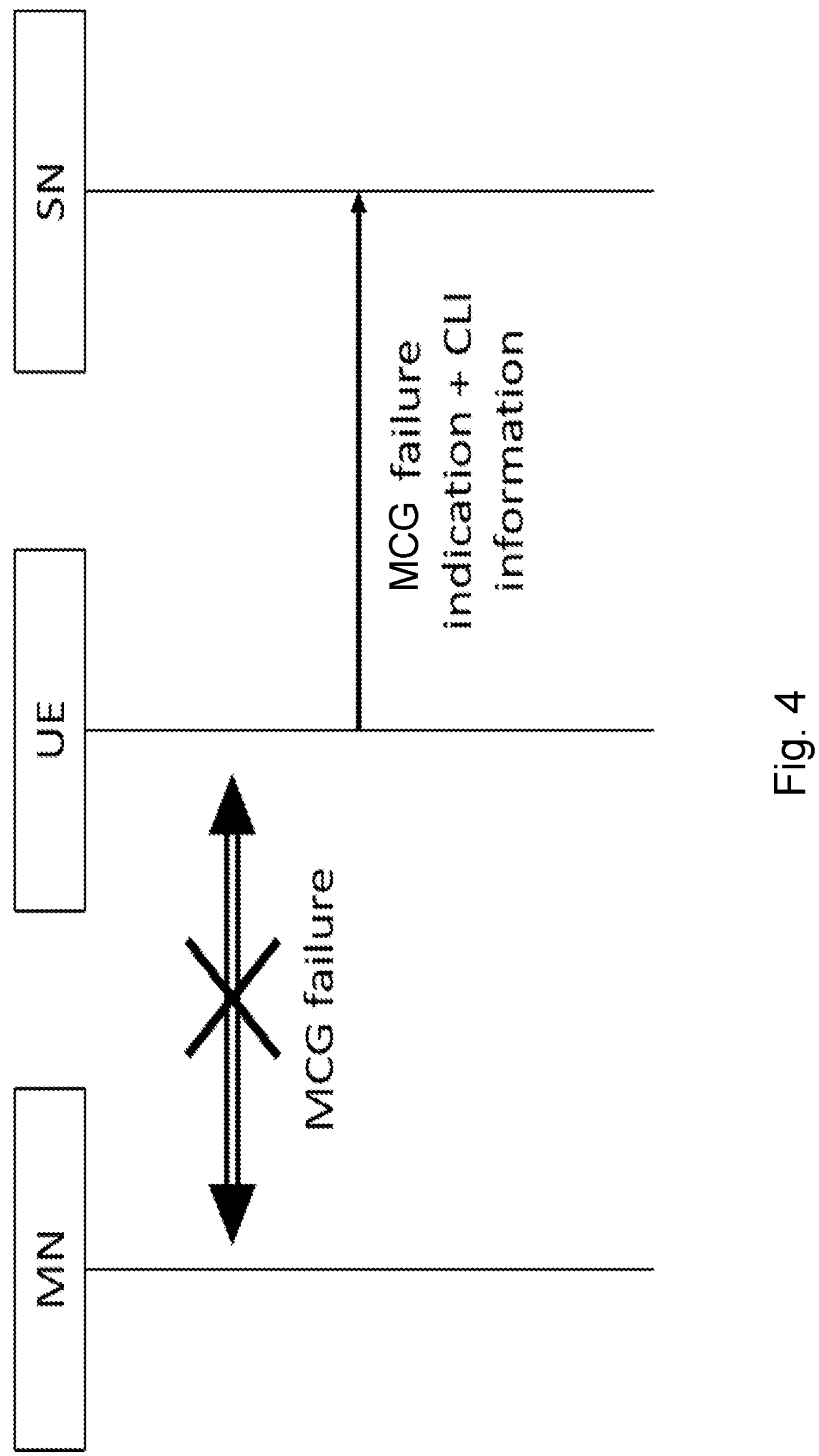
FIG. 4 is a sequence diagram illustrating MCG failure with CLI information.

FIG. 4 is a sequence diagram illustrating MCG failure with CLI information. In the illustrated example, the UE detects a radio failure between the UE and the MCG. Upon detecting the failure, the UE send CLI information to the SCG.

Figure 5:
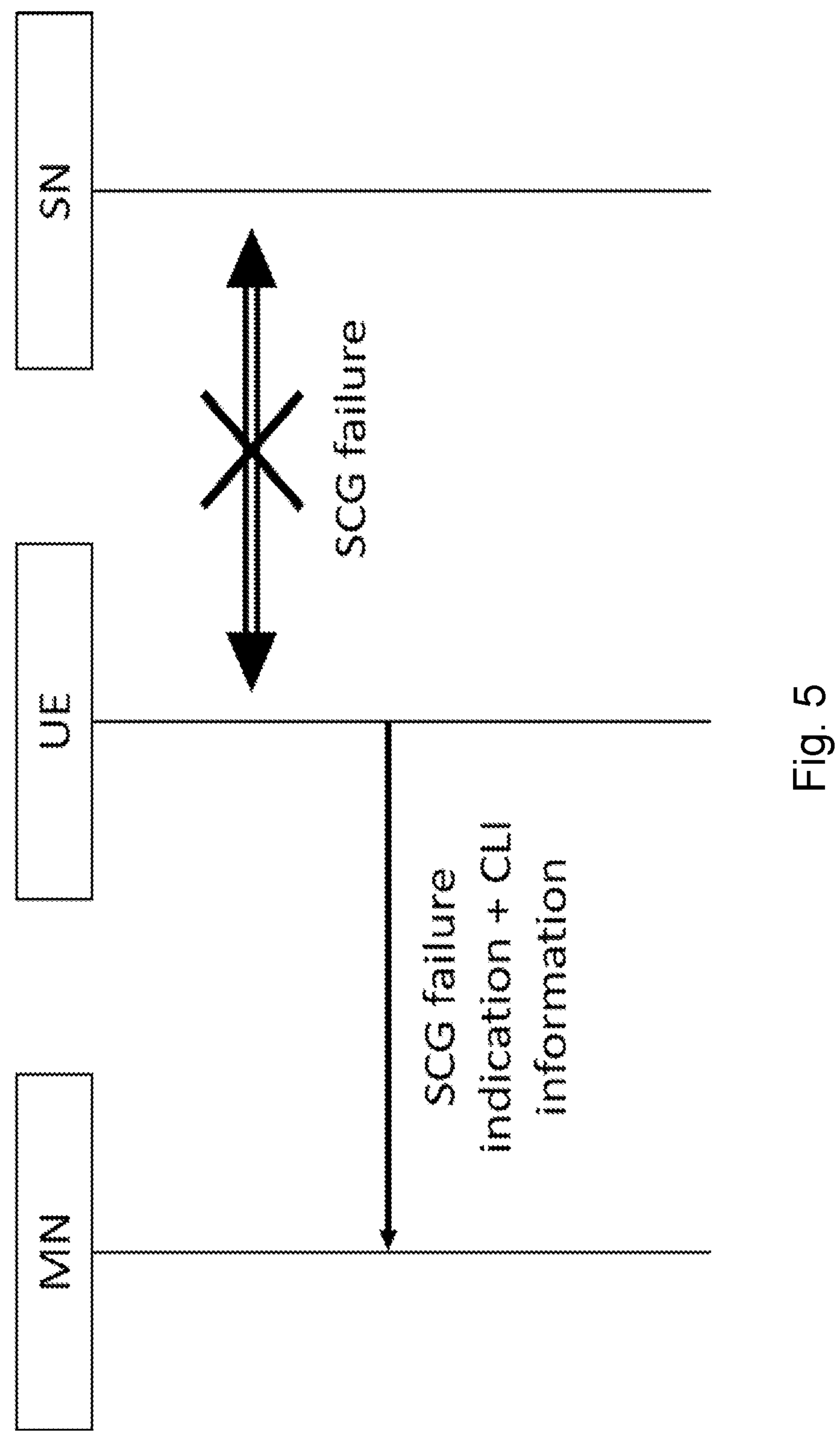
FIG. 5 is a sequence diagram illustrating SCG failure with CLI information.

FIG. 5 is a sequence diagram illustrating SCG failure with CLI information. In the illustrated example, the UE detects a radio failure between the UE and the SCG. Upon detecting the failure, the UE send CLI information to the MCG.

Below is an example of how some of the embodiments may be implemented in a RRC specification, such as 38.331.

5.7.3 SCG Failure Information 5.7.3.1 General

Figure 6:
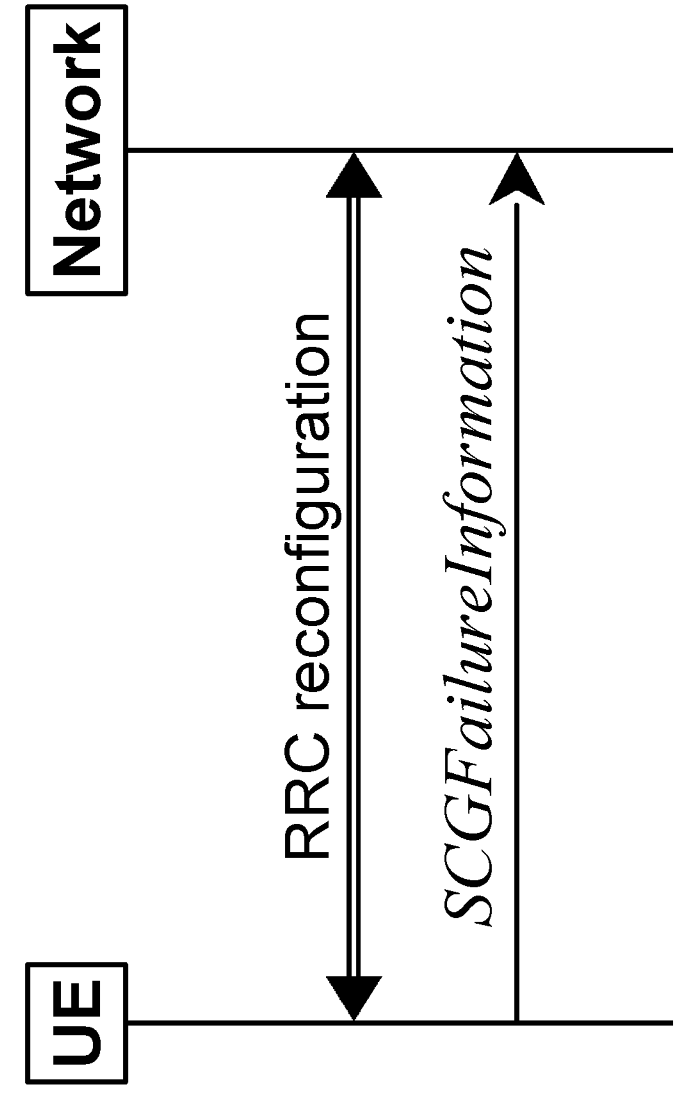
FIG. 6 is a sequence diagram illustrating SCG failure information.

FIG. 6 is a sequence diagram illustrating SCG failure information and is a reproduction of FIG. 5.7.3.1-1.

The purpose of this procedure is to inform E-UTRAN or NR MN about an SCG failure the UE has experienced i.e. SCG radio link failure, failure of SCG reconfiguration with sync, SCG configuration failure for RRC message on SRB3 and SCG integrity check failure.

5.8.3.2 Initiation

A UE initiates the procedure to report SCG failures when SCG transmission is not suspended and when one of the following conditions is met:

1> upon detecting radio link failure for the SCG, in accordance with subclause 5.3.10.3;

1> upon reconfiguration with sync failure of the SCG, in accordance with subclause 5.3.5.8.3;

1> upon SCG configuration failure, in accordance with subclause 5.3.5.8.2;

1> upon integrity check failure indication from SCG lower layers concerning SRB3.

Upon initiating the procedure, the UE shall:

1> suspend SCG transmission for all SRBs and DRBs;

1> reset SCG MAC;

1> stop T304 for the SCG, if running;

1> if the UE is in (NG)EN-DC:

2> initiate transmission of the SCGFailureInformationNR message as specified in TS 36.331, clause 5.6.13a.

1> else:

2> initiate transmission of the SCGFailureInformation message in accordance with 5.7.3.3 Failure Type Determination for (NG)EN-DC The UE shall set the SCG failure type as follows:

1> if the UE initiates transmission of the SCGFailureInformationNR message due to T310 expiry:

2> set the failure Type as t310-Expiry;

1> else if the UE initiates transmission of the SCGFailureInformationNR message to provide reconfiguration with sync failure information for an SCG:

2> set the failure Type as synchReconfigFailure-SCG;

1> else if the UE initiates transmission of the SCGFailureInformationNR message to provide random access problem indication from SCG MAC:

2> set the failure Type as randomAccessProblem;

1> else if the UE initiates transmission of the SCGFailureInformationNR message to provide indication from SCG RLC that the maximum number of retransmissions has been reached:

2> set the failure Type as rlc-MaxNumRetx;

1> else if the UE initiates transmission of the SCGFailureInformationNR message due to SRB3 integrity check failure:

2> set the failure Type as srb3-IntegrityFailure;

1> else if the UE initiates transmission of the SCGFailureInformationNR message due to Reconfiguration failure of NR RRC reconfiguration message:

2> set the failure Type as scg-reconfigFailure 5.7.3.4 Setting the Contents of MeasResultSCG-Failure The UE shall set the contents of the MeasResultSCG-Failure as follows:

1> for each MeasObjectNR configured on NR SCG for which a measId is configured and measurement results are available:

2> include an entry in measResultPerMOList;

2> if there is a measId configured with the MeasObjectNR and a reportConfig which has rsType set to ssb:

3> set ssbFrequency to the value indicated by ssbFrequency as included in the MeasObjectNR;

2> if there is a measId configured with the MeasObjectNR and a reportConfig which has rsType set to csi-rs:

3> set refFreqCSI-RS to the value indicated by refFreqCSI-RS as included in the associated measurement object;

2> if a serving cell is associated with the MeasObjectNR:

3> set measResultServingCell to include the available quantities of the concerned cell and in accordance with the performance requirements in TS 38.133;

2> set the measResultNeighCellList to include the best measured cells, ordered such that the best cell is listed first, and based on measurements collected up to the moment the UE detected the failure, and set its fields as follows;

3> ordering the cells with sorting as follows:

4> based on SS/PBCH block if SS/PBCH block measurement results are available and otherwise based on CSI-RS;

4> using RSRP if RSRP measurement results are available, otherwise using RSRQ if RSRQ measurement results are available, otherwise using SINR;

3> for each neighbour cell included:

4> include the optional fields that are available.

NOTE: The measured quantities are filtered by the L3 filter as configured in the mobility measurement configuration. The measurements are based on the time domain measurement resource restriction, if configured. Blacklisted cells are not required to be reported.

1> if there is at least one MeasObjectCLI configured on NR SCG for which a measId is configured and measurement results are available:

2> set the measResultCLI to include the most interfering SRS resources or most interfering CLI-RSSI resources up to maxReportCLI in accordance with the following:

3> include the SRS resource included in the cli-TriggeredList as defined within the VarMeasReportList for this measId;

3> include the CLI-RSSI resource included in the cli-TriggeredList as defined within the VarMeasReportList for this measId;

3> for each SRS resource that is included in the measResultCLI:

4> include the srs-ResourceId;

4> set srs-RSRP-Result to include the layer 3 filtered measured results in decreasing order, i.e. the most interfering SRS resource is included first;

3> for each CLI-RSSI resource that is included in the measResultCLI:

4> include the rssi-ResourceId;

4> set cli-RSSI-Result to include the layer 3 filtered measured results in decreasing order, i.e. the most interfering CLI-RSSI resource is included first;

1> if there is at least one MeasObjectCLI configured on NR MCG for which a measId is configured and measurement results are available:

5.7.3.5 Actions Related to Transmission of SCGFailureInformation Message

The UE shall set the contents of the SCGFailureInformation message as follows:

1> if the UE initiates transmission of the SCGFailureInformation message due to T310 expiry:

2> set the failure Type as t310-Expiry;

1> else if the UE initiates transmission of the SCGFailureInformation message to provide reconfiguration with sync failure information for an SCG:

2> set the failure Type as synchReconfigFailure-SCG;

1> else if the UE initiates transmission of the SCGFailureInformation message to provide random access problem indication from SCG MAC:

2> set the failure Type as randomAccessProblem;

1> else if the UE initiates transmission of the SCGFailureInformation message to provide indication from SCG RLC that the maximum number of retransmissions has been reached:

2> set the failure Type as rlc-MaxNumRetx;

1> else if the UE initiates transmission of the SCGFailureInformation message due to SRB3 IP check failure:

2> set the failure Type as srb3-IntegrityFailure;

1> else if the UE initiates transmission of the SCGFailureInformation message due to Reconfiguration failure of NR RRC reconfiguration message:

2> set the failure Type as scg-reconfigFailure.

1> include and set MeasResultSCG-Failure in accordance with 5.7.3.4;

1> for each MeasObjectNR configured by a MeasConfig associated with the MCG, and for which measurement results are available:

2> include an entry in measResultFreqList;

2> if there is a measId configured with the MeasObjectNR and a reportConfig which has rsType set to ssb:

3> set ssbFrequency in measResultFreqList to the value indicated by ssbFrequency as included in the MeasObjectNR;

2> if there is a measId configured with the MeasObjectNR and a reportConfig which has rsType set to csi-rs:

3> set refFreqCSI-RS in measResultFreqList to the value indicated by refFreqCSI-RS as included in the associated measurement object;

2> if a serving cell is associated with the MeasObjectNR:

3> set measResultServingCell in measResultFreqList to include the available quantities of the concerned cell and in accordance with the performance requirements in TS 38.133;

2> set the measResultNeighCellList in measResultFreqList to include the best measured cells, ordered such that the best cell is listed first, and based on measurements collected up to the moment the UE detected the failure, and set its fields as follows;

3> ordering the cells with sorting as follows:

4> based on SS/PBCH block if SS/PBCH block measurement results are available and otherwise based on CSI-RS;

4> using RSRP if RSRP measurement results are available, otherwise using RSRQ if RSRQ measurement results are available, otherwise using SINR;

3> for each neighbour cell included:

4> include the optional fields that are available.

1> if there is at least one MeasObjectCLI configured on NR MCG for which a measId is configured and measurement results are available:

2> set the measResultCLI to include the most interfering SRS resources or most interfering CLI-RSSI resources up to maxReportCLI in accordance with the following:

3> include the SRS resource included in the cli-TriggeredList as defined within the VarMeasReportList for this measId;

3> include the CLI-RSSI resource included in the cli-TriggeredList as defined within the VarMeasReportList for this measId;

3> for each SRS resource that is included in the measResultCLI:

4> include the srs-ResourceId;

4> set srs-RSRP-Result to include the layer 3 filtered measured results in decreasing order, i.e. the most interfering SRS resource is included first;

3> for each CLI-RSSI resource that is included in the measResultCLI:

4> include the rssi-ResourceId;

4> set cli-RSSI-Result to include the layer 3 filtered measured results in decreasing order, i.e. the most interfering CLI-RSSI resource is included first;

NOTE 1: The measured quantities are filtered by the L3 filter as configured in the mobility measurement configuration. The measurements are based on the time domain measurement resource restriction, if configured. Blacklisted cells are not required to be reported.

NOTE 2: Field measResultSCG-Failure is used to report available results for NR frequencies the UE is configured to measure by SCG RRC signalling.

The UE shall submit the SCGFailureInformation message to lower layers for transmission.

MeasResultSCG-Failure

The IE MeasResultSCG-Failure is used to provide information regarding failures detected by the UE in EN-DC.

MeasResultSCG-Failure Information Element

```
-- ASN1START
-- TAG-MEASRESULTSCG-FAILURE-START
MeasResultSCG-Failure : :=                          SEQUENCE {
        measResultPerMOList                              MeasResultList2NR,
        . . . ,
        [ [
        measResultCLI-r16                         MeasResultCLI-r16
OPTIONAL
          ] ]
}
MeasResultList2NR : :=        SEQUENCE (SIZE (1 . . maxFreq) ) OF MeasResult2NR
}
-- TAG-MEASRESULTSCG-FAILURE-STOP
-- ASN1STOP
```

SCGFailureInformation Message

```
-- ASN1START
-- TAG-SCGFAILUREINFORMATION-START
SCGFailureInformation : :=            SEQUENCE {
        criticalExtensions                    CHOICE {
                scgFailureInformation                 SCGFailure Information-IEs,
                criticalExtensions Future             SEQUENCE { }
        }
}
SCGFailure Information-IEs : :=       SEQUENCE {
        failureReportSCG                      FailureReportSCG              OPTIONAL,
        nonCriticalExtension                  SEQUENCE { }                  OPTIONAL
}
FailureReportSCG : :=                 SEQUENCE {
        failureType                           ENUMERATED {
                                                      t310-Expiry, randomAccess Problem,
                                                      rlc-MaxNumRetx,
                                                      synchReconfigFailureSCG, scg-
ReconfigFailure,
                                                      srb3-IntegrityFailure, spare2,
spare1},
        measResultFreqList                    Meas ResultFreqList
OPTIONAL,
        measResultSCG-Failure                 OCTET STRING (CONTAINING MeasResultSCG-
Failure)                              OPTIONAL,
        . . . ,
     [ [
        measResultCLI-r16                     MeasResultCLI-r16
OPTIONAL
        ] ]
}
MeasResultFreqList : : =              SEQUENCE (SIZE (1 .. maxFreq) ) OF MeasResult2NR
-- TAG-SCGFAILUREINFORMATION-STOP
-- ASN1STOP
```

| SCGFailureInformation field descriptions |
|---|
| measResultFreqList<br>The field contains available results of measurements on NR frequencies the UE is configured to measure by measConfig. |
| measResultSCG-Failure<br>The field contains the MeasResultSCG-Failure IE which includes available results of measurements on NR frequencies the UE is configured to measure by the NR SCG RRCReconfiguration message. |

MCG failure 38.331 Text proposal

MCG failure information 5.7.y.1 General

Figure 7:
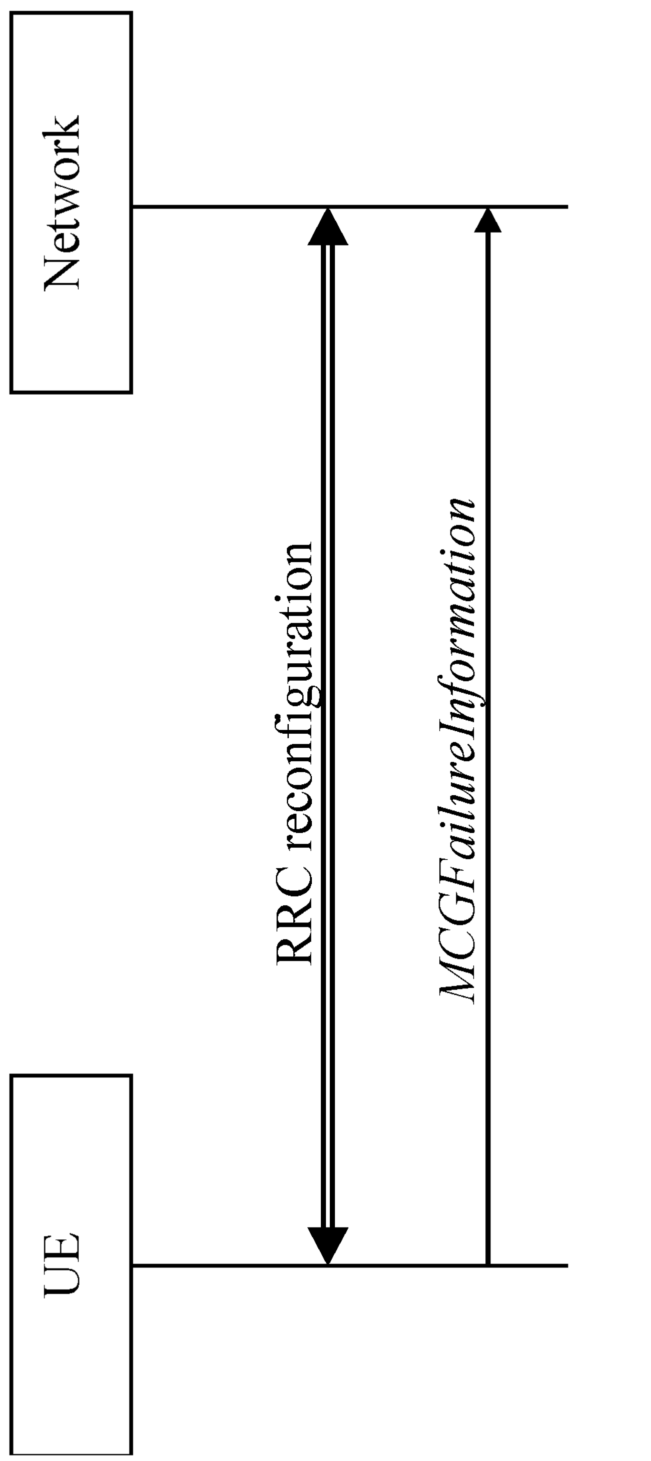
FIG. 7 is a sequence diagram illustrating MCG failure information.

FIG. 7 is a sequence diagram illustrating MCG failure information.

The purpose of this procedure is to inform NR MN about an MCG failure the UE has experienced i.e. MCG radio link failure. A UE in RRCSONNECTED, for which AS security has been activated with SRB2 and at least one DRB setup, may initiate the fast MCG link recovery procedure in order to continue the RRC connection without re-establishment.

5.7.y.2 Initiation

A UE configured with split SRB1 or SRB3 initiates the procedure to report MCG failures when neither MCG nor SCG transmission is suspended, fast MCG link recovery is configured (i.e. T316 is configured), and when the following condition is met:

1> upon detecting radio link failure of the MCG, in accordance with 5.3.10.3.

Upon initiating the procedure, the UE shall:

1> suspend MCG transmission for all SRBs and DRBs, except SRB0;

1> reset MCG-MAC;

1> initiate transmission of the MCGFailureInformation message in accordance with 5.7.y.4.

5.7.y.3 Failure Type Determination

The UE shall set the MCG failure type as follows:

1> if the UE initiates transmission of the MCGFailureInformation message due to T310 expiry:

2> set the failure Type as t310-Expiry;

1> else if the UE initiates transmission of the MCGFailureInformation message to provide random access problem indication from MCG MAC:

2> set the failure Type as randomAccessProblem;

1> else if the UE initiates transmission of the MCGFailureInformation message to provide indication from MCG RLC that the maximum number of retransmissions has been reached:

2> set the failure Type as rlc-MaxNumRetx.

5.7.y.4 Actions Related to Transmission ofMCGFailureInformation Message

The UE shall set the contents of the MCGFailureInformation message as follows:

1> include and set failure Type in accordance with 5.7.y.3;

1> for each MeasObjectNR configured by a measConfig associated with the MCG, and for which measurement results are available:

2> include an entry in measResultFreqList;

2> if there is a measId configured with the MeasObjectNR and a reportConfig which has rsType set to ssb:

3> set ssbFrequency in measResultFreqList to the value indicated by ssbFrequency as included in the MeasObjectNR;

2> if there is a measId configured with the MeasObjectNR and a reportConfig which has rsType set to csi-rs:

3> set refFreqCSI-RS in measResultFreqList to the value indicated by refFreqCSI-RS as included in the associated measurement object;

2> if a serving cell is associated with the MeasObjectNR:

3> set measResultServingCell in measResultFreqList to include the available quantities of the concerned cell and in accordance with the performance requirements in TS 38.133;

2> set the measResultNeighCellList in measResultFreqList to include the best measured cells, ordered such that the best cell is listed first, and based on measurements collected up to the moment the UE detected the failure, and set its fields as follows;

3> ordering the cells with sorting as follows:

4> based on SS/PBCH block if SS/PBCH block measurement results are available and otherwise based on CSI-RS;

4> using RSRP if RSRP measurement results are available, otherwise using RSRQ if RSRQ measurement results are available, otherwise using SINR;

3> for each neighbour cell included:

4> include the optional fields that are available.

1> for each EU IRA frequency the UE is configured to measure by measConfig for which measurement results are available:

2> set the measResultFreqListEUTRA to include the best measured cells, ordered such that the best cell is listed first using RSRP to order if RSRP measurement results are available for cells on this frequency, otherwise using RSRQ to order if RSRQ measurement results are available for cells on this frequency, otherwise using SINR to order, and based on measurements collected up to the moment the UE detected the failure, and for each cell that is included, include the optional fields that are available;

1> if there is at least one MeasObjectCLI configured on NR MCG for which a measId is configured and measurement results are available:

2> set the measResultCLI to include the most interfering SRS resources or most interfering CLI-RSSI resources up to maxReportCLI in accordance with the following:

3> include the SRS resource included in the cli-TriggeredList as defined within the VarMeasReportList for this measId;

3> include the CLI-RSSI resource included in the cli-TriggeredList as defined within the VarMeasReportList for this measId;

3> for each SRS resource that is included in the measResultCLI:

4> include the srs-ResourceId;

4> set srs-RSRP-Result to include the layer 3 filtered measured results in decreasing order, i.e. the most interfering SRS resource is included first;

3> for each CLI-RSSI resource that is included in the measResultCLI:

4> include the rssi-ResourceId;

4> set cli-RSSI-Result to include the layer 3 filtered measured results in decreasing order, i.e. the most interfering CLI-RSSI resource is included first;

1> if the UE is in NR-DC:

2> include and set measResultSCG in accordance with 5.7.3.4;

1> if the UE is in NE-DC:

2> include and set measResultSCG-EUTRA in accordance with TS 36.331 clause 5.6.13.5;

NOTE 1: The measured quantities are filtered by the L3 filter as configured in the mobility measurement configuration. The measurements are based on the time domain measurement resource restriction, if configured. Blacklisted cells are not required to be reported.

NOTE 2: Field measResultSCG-Failure is used to report available results for NR frequencies the UE is configured to measure by SCG RRC signalling.

NOTE 3: Field measResultSCG-EUTRA is used to report available results for E-UTRAN frequencies the UE is configured to measure by E-UTRA RRC signalling.

1> if SRB1 is configured as split SRB and pdcp-Duplication is not configured:

2> if primary Path refers to the MCG:

3> set primaryPath to refer to the SCG.

The UE shall:

1> start timer T316;

1> if SRB1 is configured as split SRB:

2> submit the MCGFailureInformation message to lower layers for transmission via SRB1, upon which the procedure ends;

2> else (i.e. SRB3 configured):

3> submit the MCGFailureInformation message to lower layers for transmission embedded in NR RRC message ULInformationTransferMRDC via SRB3 as specified in 5.7.2a.3.

5.7.y.5 T316 Expiry

The UE shall:

1> if T316 expires:

2> initiate the connection re-establishment procedure as specified in 5.3.7.

Figure 8:
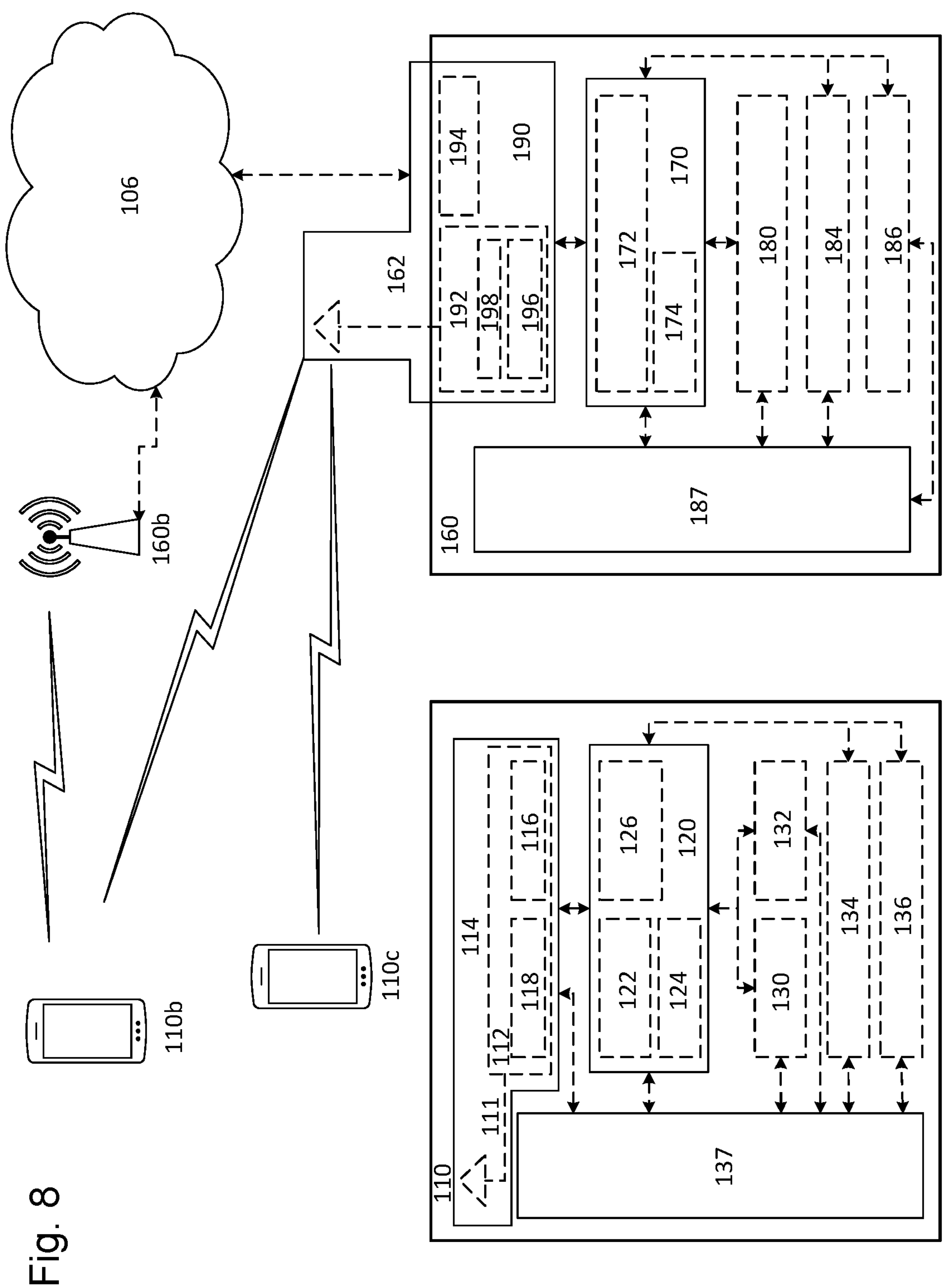
FIG. 8 is a block diagram illustrating an example wireless network.

FIG. 8 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 160 includes processing circuitry 170, device readable medium 180, interface 190, auxiliary equipment 184, power source 186, power circuitry 187, and antenna 162. Although network node 160 illustrated in the example wireless network of FIG. 8 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components. In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components ofnetwork node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 8 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 9:
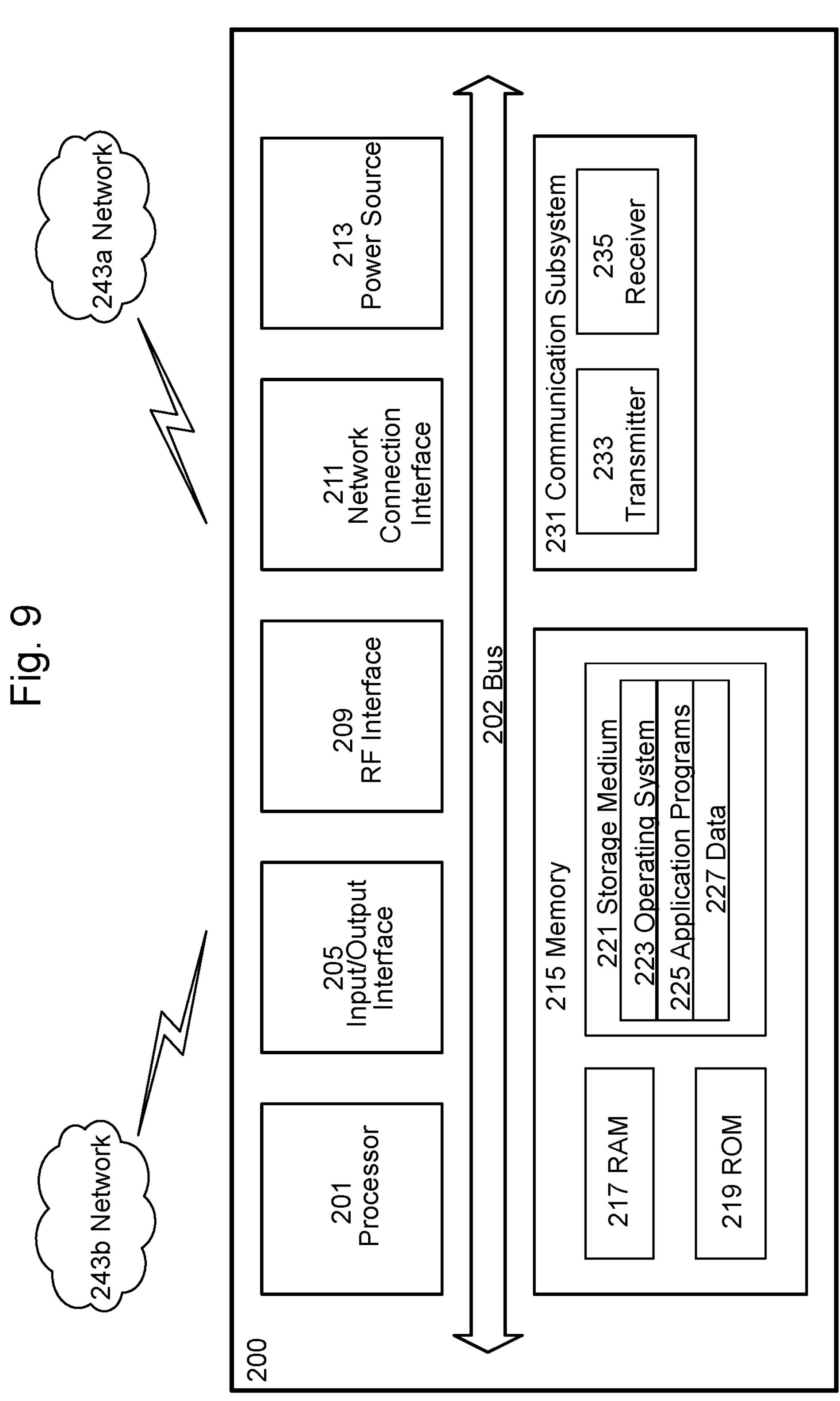
FIG. 9 illustrates an example user equipment, according to certain embodiments.

FIG. 9 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 9, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 209 may be configured to provide a communication interface to RF components such as a transmitter, a receiver, and an antenna. Network connection interface 211 may be configured to provide a communication interface to network **243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211** may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 9, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 10:
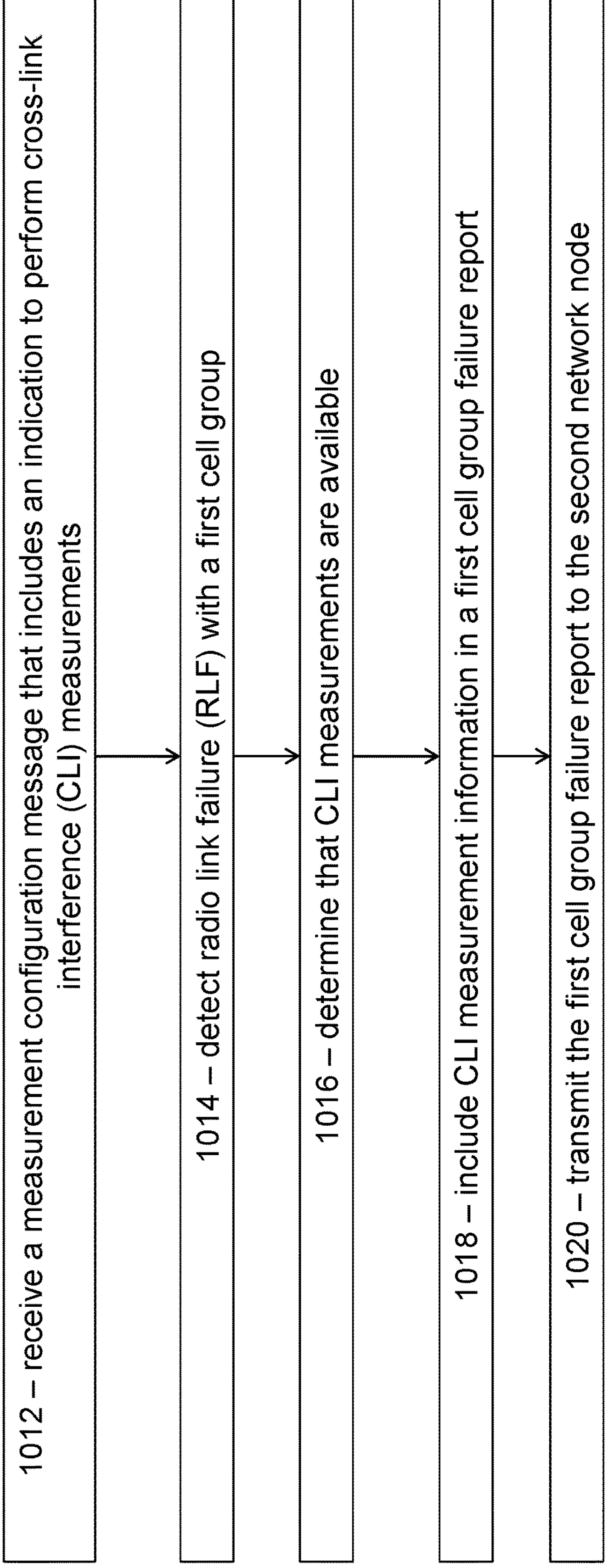
FIG. 10 is flowchart illustrating an example method in a wireless device, according to certain embodiments.

FIG. 10 is a flowchart illustrating an example method in a wireless device, according to certain embodiments. In particular embodiments, one or more steps of FIGURE may be performed by wireless device 110 described with respect to FIG. 8. The wireless device is capable of operating in dual connectivity with a first network node in a first cell group and a second network node in a second cell group.

The method may begin at step 1012, where the wireless device (e.g., wireless device 110) receives a measurement configuration message that includes an indication to perform CLI measurements. For example, a SN (e.g., network node 120) may suspect CLI and configure wireless device 110 to perform CLI measurements. Similarly, a MN (e.g., network node 120) may suspect CLI and configure wireless device 110 to perform CLI measurements.

In some embodiments, the measurement configuration may be received in a MeasConfig within a RRCReconfiguration or RRCResume message.

In some embodiments, the measurement configuration may be received according to any of the embodiments and examples described above.

At step 1014, the wireless device detects RLF with the first cell group. In particular embodiments, detecting the RLF comprises detecting one or more of a timer expiration, random access problem, or an indication from the radio link control layer that a maximum number of retransmissions has been reached.

At step 1016, the wireless device determines that CLI measurements are available. For example, the wireless device may have performed and stored CLI measurements but not have had an opportunity to send the CLI measurements before detecting RLF.

At step 1018, the wireless device includes CLI measurement information in a first cell group failure report. For example, because the CLI measurement was not previously sent to the first cell group, the wireless device can include some or all of the CLI measurement information in the cell group failure report for the first cell group.

In particular embodiments, the CLI measurement information may only be included in the first cell group failure report when the RLF is based on one or more of a timer expiration, random access problem, or an indication from the radio link control layer that a maximum number of retransmissions has been reached. Thus, if the cell group failure report was caused by a condition unrelated to radio conditions, then there is no need to include the CLI measurement information in the cell group failure report.

In particular embodiments, the CLI measurement information included in the first cell group failure report is less than an amount of information configured for RRM.

At step 1020, the wireless device transmits the first cell group failure report to the second network node. A benefit is that the second network node will receive the CLI measurement information for the first network node and may forward the information to the first network node.

In particular embodiments, the first network node comprises a master node, the first cell group comprises a MCG, the second network node comprises a secondary node, and the second cell group comprises a SCG. In other embodiments, the first network node comprises a secondary node, the first cell group comprises a SCG, the second network node comprises a master node, and the second cell group comprises a MCG.

Modifications, additions, or omissions may be made to method 1000 of FIG. 10. Additionally, one or more steps in the method of FIG. 10 may be performed in parallel or in any suitable order.

FIG. 11 is a flowchart illustrating an example method in a first network node, according to certain embodiments. In particular embodiments, one or more steps of FIG. 11 may be performed by network node 160 described with respect to FIG. 8. The method is performed by a first network node in a first cell group operating in dual connectivity with a wireless device.

The method begins at step 1112, where the first network node (e.g., network node 160) transmits to the wireless device a measurement configuration message that includes an indication for the wireless device to perform CLI measurement. For example, the first network node (e.g., MN or SN) may suspect CLI between itself and the wireless device and configure the wireless device to perform CLI measurement to get a better understanding of the radio conditions.

In particular embodiments, the measurement configuration is transmitted in a MeasConfig within a RRCReconfiguration or RRCResume message. The measurement configuration may include an indication of one or more conditions under which the wireless device should report CLI measurements. At least one of the one or more conditions comprises a failure that relates to radio conditions. For example, at least one of the one or more conditions may comprise one or more of a timer expiration, random access problem, or an indication from the radio link control layer that a maximum number of retransmissions has been reached.

At step 1114, the first network node receives from a second network node in a second cell group that an indication that a radio link failure occurred between the wireless device and the first cell group and CLI measurement information. For example, if the RLF occurred before the wireless device was able to send CLI measurements to the first network node, the wireless device may send some or all of the CLI measurements to the second network node, where it is then forwarded to the first network node. In particular embodiments, the first network node comprises a master node, the first cell group comprises a MCG, the second network node comprises a secondary node, and the second cell group comprises a SCG. In other embodiments, the first network node comprises a secondary node, the first cell group comprises a SCG, the second network node comprises a master node, and the second cell group comprises a MCG.

Modifications, additions, or omissions may be made to method 1100 of FIG. 11. Additionally, one or more steps in the method of FIG. 11 may be performed in parallel or in any suitable order.

FIG. 12 is a flowchart illustrating another example method in a first network node, according to certain embodiments. In particular embodiments, one or more steps of FIG. 12 may be performed by network node 160 described with respect to FIG. 8. The method is performed by a first network node in a first cell group operating in dual connectivity with a wireless device.

The method begins at step 1212, where the first network node (e.g., network node 160) receives from the wireless device a second cell group failure report. The second cell group failure report includes CLI measurement information.

At step 1214, the first network node determines the second cell group failure report is associated with a second network node in the second cell group.

At step 1216, the first network node transmits to the second network node an indication that a radio link failure occurred between the wireless device and the second cell group and the CLI measurement information. The second network node may use the CLI measurement information to better understand the interference between the second cell group and the wireless device.

In particular embodiments, the first network node comprises a master node, the first cell group comprises a MCG, the second network node comprises a secondary node, and the second cell group comprises a SCG. In other embodiments, the first network node comprises a secondary node, the first cell group comprises a SCG, the second network node comprises a master node, and the second cell group comprises a MCG.

Modifications, additions, or omissions may be made to method 1200 of FIG. 12. Additionally, one or more steps in the method of FIG. 12 may be performed in parallel or in any suitable order.

Figure 13:
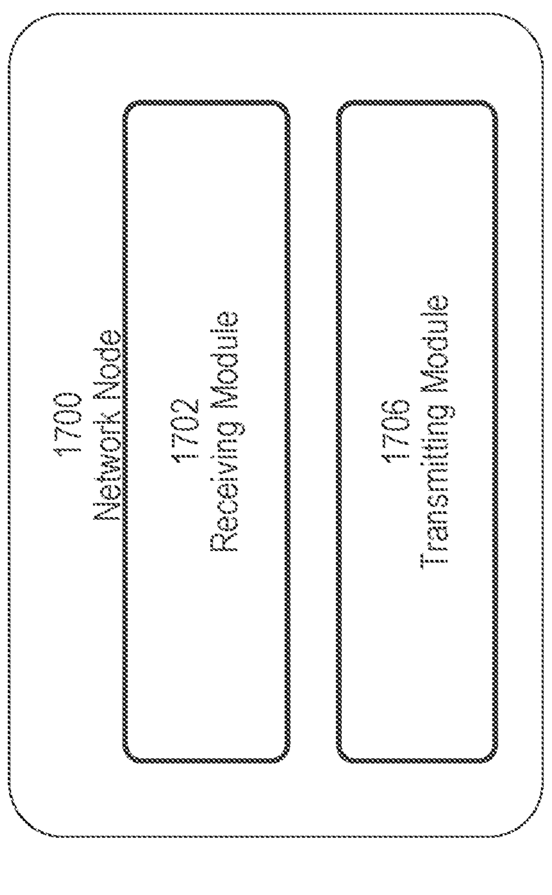
FIG. 13 illustrates a schematic block diagram of a wireless device and a network node in a wireless network, according to certain embodiments.

FIG. 13 illustrates a schematic block diagram of two apparatuses in a wireless network (for example, the wireless network illustrated in FIG. 8). The apparatuses include a wireless device and a network node (e.g., wireless device 110 and network node 160 illustrated in FIG. 8). Apparatuses 1600 and 1700 are operable to carry out the example methods described with reference to FIGS. 10-12, and possibly any other processes or methods disclosed herein. It is also to be understood that the methods of FIGS. 10-12 are not necessarily carried out solely by apparatuses 1600 and/or 1700. At least some operations of the methods can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, detecting module 1604, transmitting module 1606, and any other suitable units of apparatus 1600 to perform corresponding functions according one or more embodiments of the present disclosure. Similarly, the processing circuitry described above may be used to cause receiving module 1702, transmitting module 1706, and any other suitable units of apparatus 1700 to perform corresponding functions according one or more embodiments of the present disclosure.

As illustrated in FIG. 13, apparatus 1600 includes receiving module 1602 configured to receive measurement configuration information according to any of the embodiments and examples described herein. Determining module 1604 is configured to determine radio link failure according to any of the embodiments and examples described herein. Transmitting module 1606 is configured to transmit measurement reports according to any of the embodiments and examples described herein.

As illustrated in FIG. 13, apparatus 1700 includes receiving module 1702 configured to receive measurement reports according to any of the embodiments and examples described herein. Transmitting module 1706 is configured to transmit measurement configuration according to any of the embodiments and examples described herein.

Figure 14:
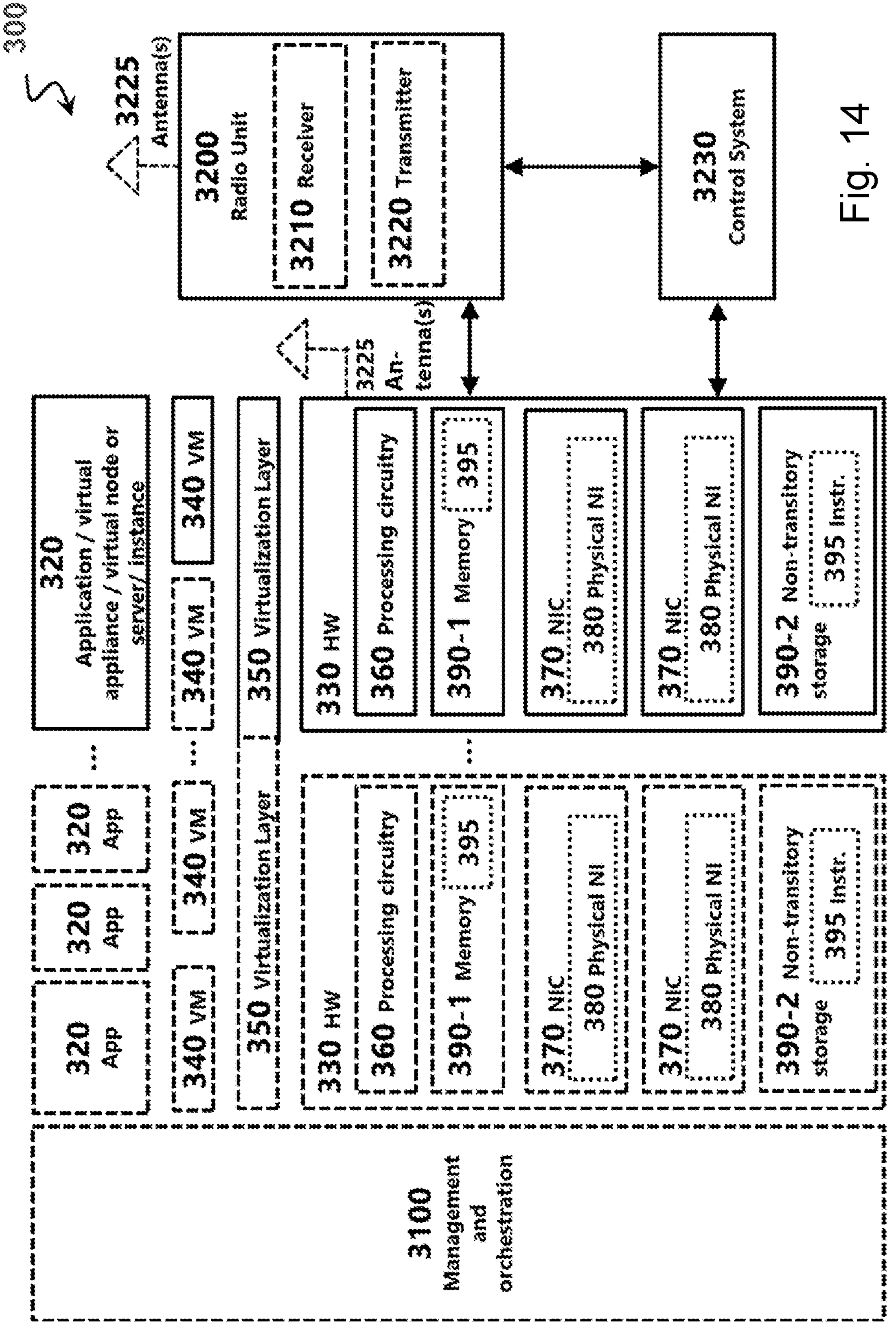
FIG. 14 illustrates an example virtualization environment, according to certain embodiments.

FIG. 14 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 14, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Figure 18:
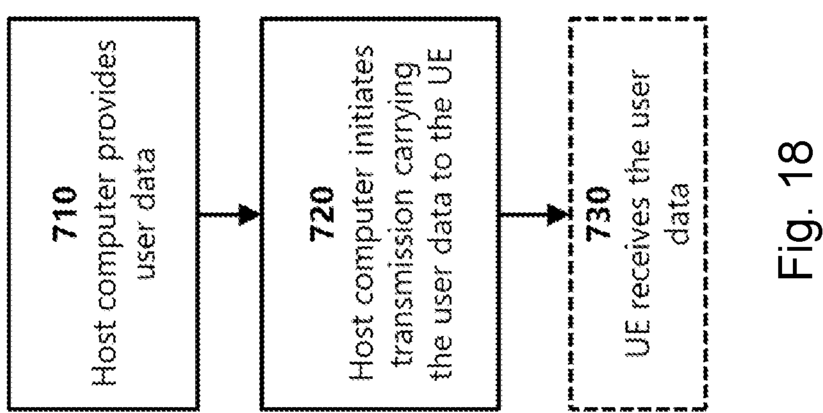
FIG. 18 is a flowchart illustrating a method implemented in a communication system, according to certain embodiments.

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 15:
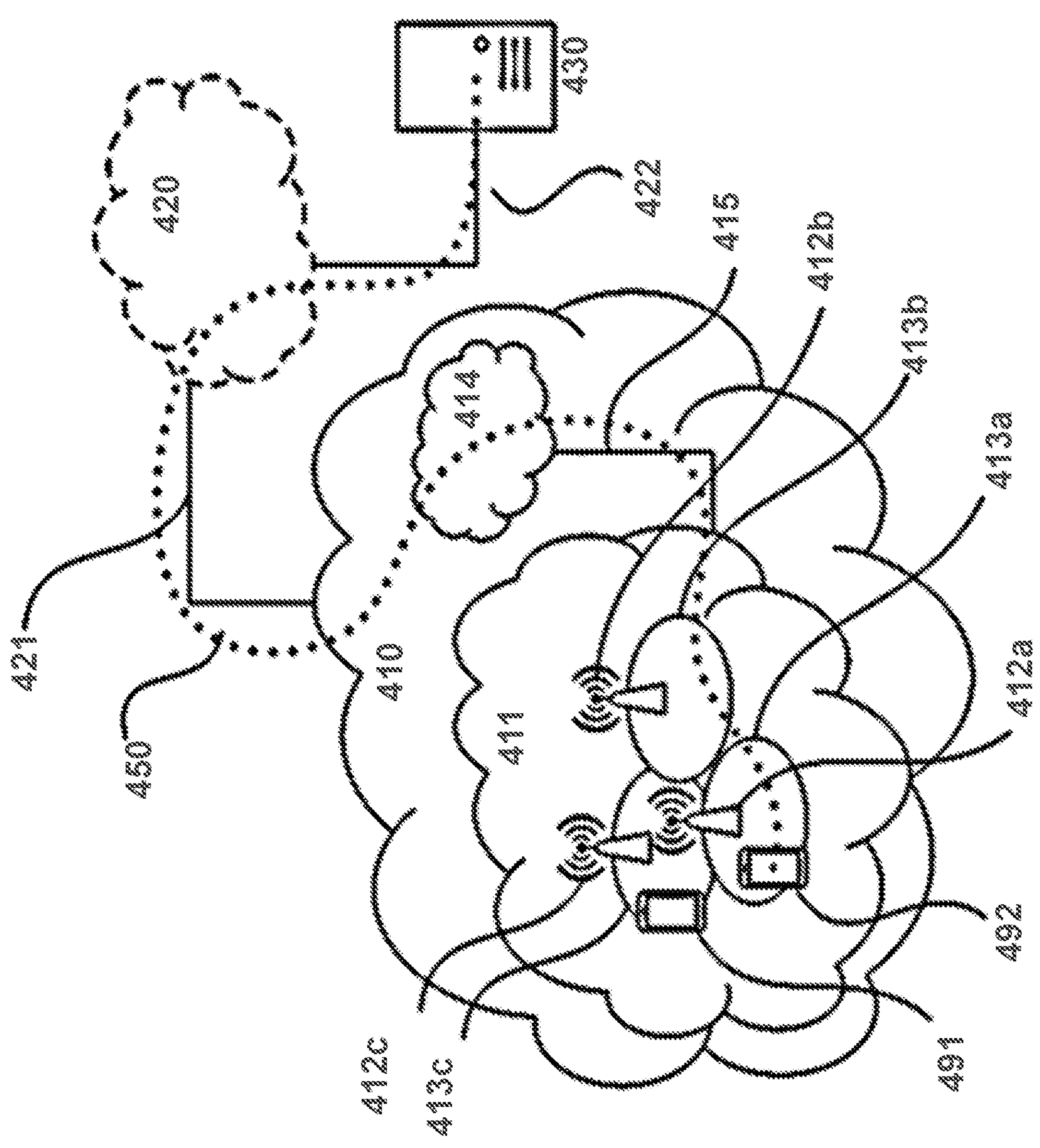
FIG. 15 illustrates an example telecommunication network connected via an intermediate network to a host computer, according to certain embodiments.

With reference to FIG. 15, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 15 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 16:
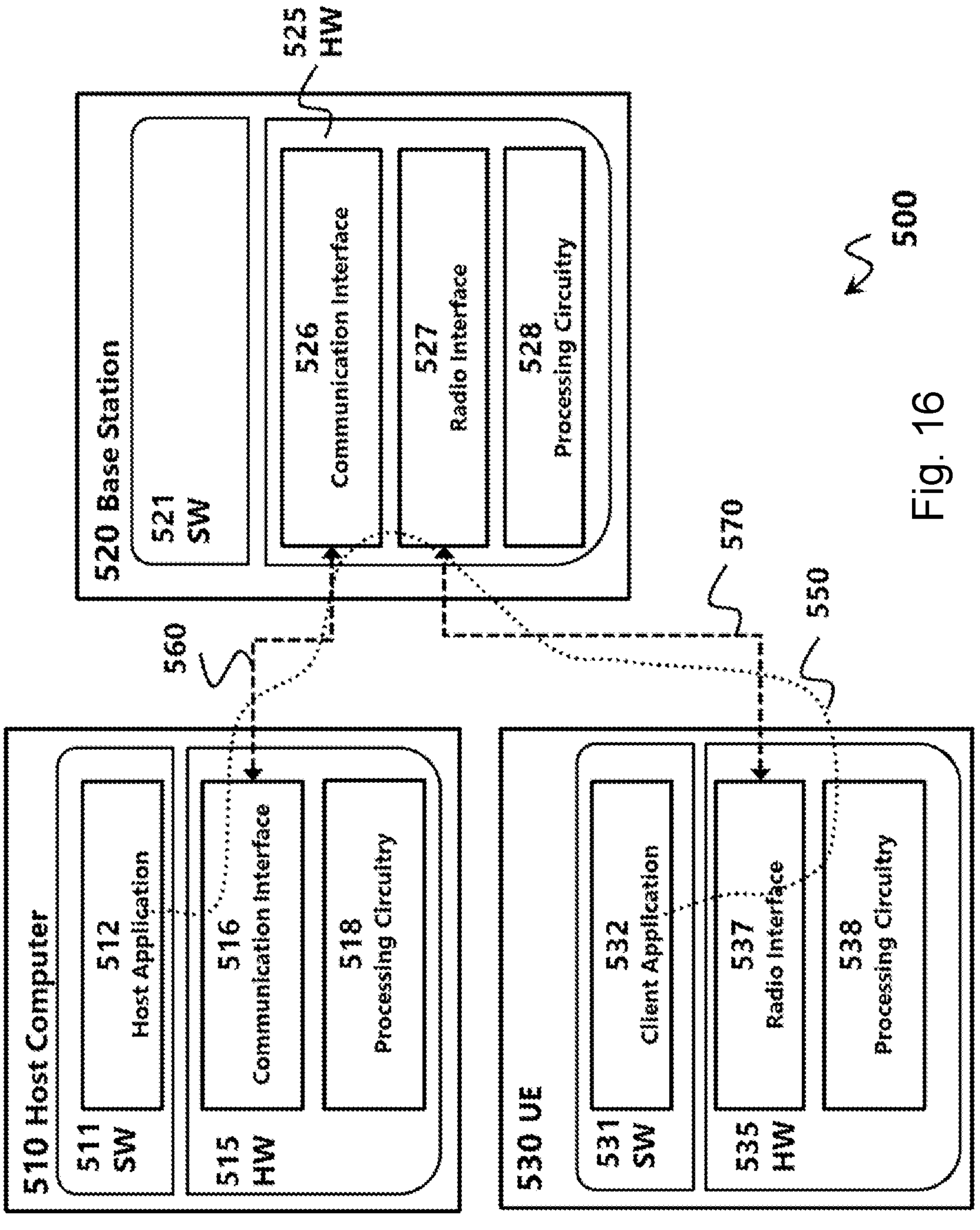
FIG. 16 illustrates an example host computer communicating via a base station with a user equipment over a partially wireless connection, according to certain embodiments.

FIG. 16 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 16. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 16) served by base station 520. Communication interface 526 may be configured to facilitate connection 560 to host computer 510. Connection 560 may be direct, or it may pass through a core network (not shown in FIG. 16) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 16 may be similar or identical to host computer 430, one of base stations 412*a*, 412*b*, 412*c* and one of UEs 491, 492 of FIG. 16, respectively. This is to say, the inner workings of these entities may be as shown in FIG. 16 and independently, the surrounding network topology may be that of FIG. 16.

In FIG. 16, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 17:
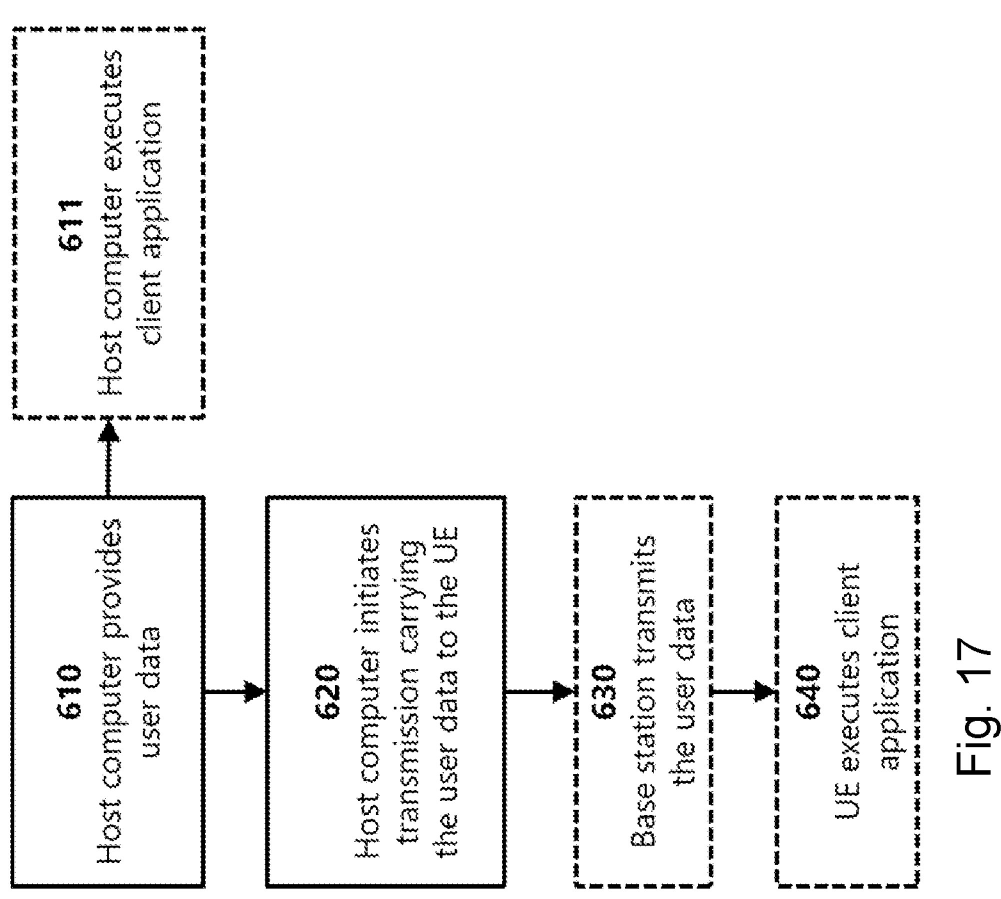
FIG. 17 is a flowchart illustrating a method implemented, according to certain embodiments.

FIG. 17 is a flowchart illustrating a method implemented in a communication system, in accordance with one embodiment. The communication system includes a host computer, a base station and a UE which may be those described with reference to FIGURES and 16. For simplicity of the present disclosure, only drawing references to FIG. 17 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 19:
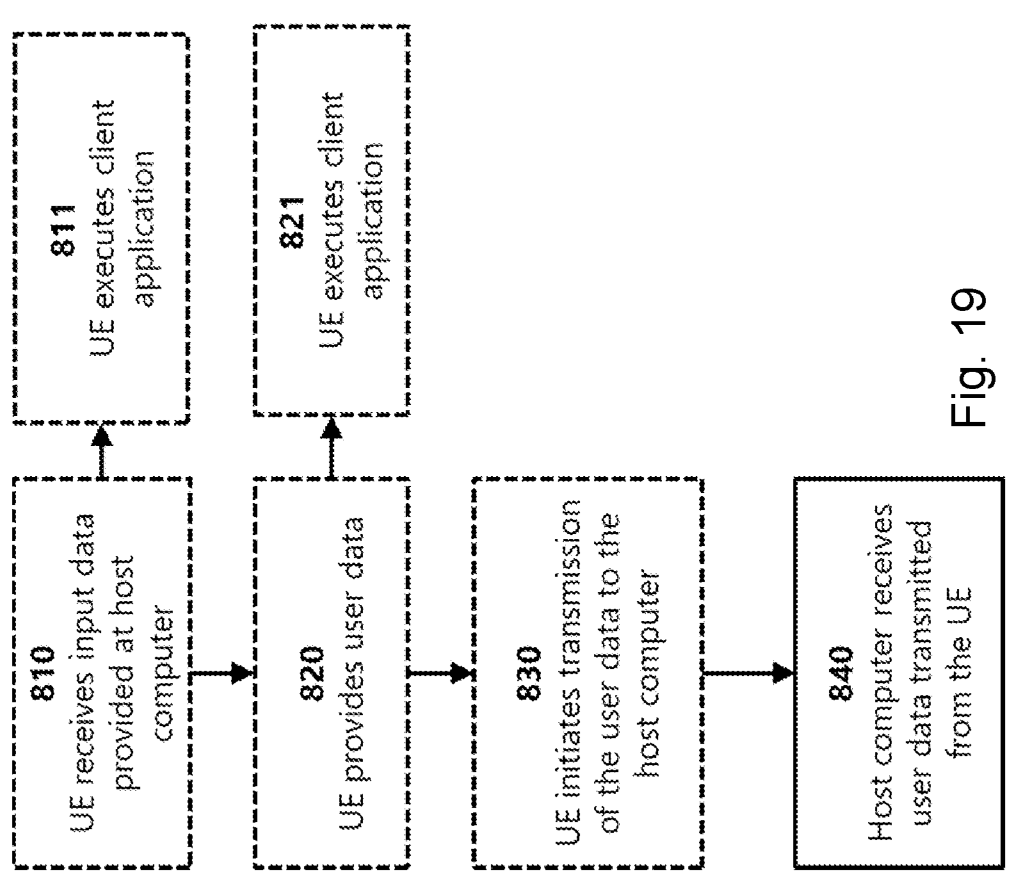
FIG. 19 is a flowchart illustrating a method implemented in a communication system, according to certain embodiments.

FIG. 19 is a flowchart illustrating a method implemented in a communication system, in accordance with one embodiment. The communication system includes a host computer, a base station and a UE which may be those described with reference to FIGURES and 16. For simplicity of the present disclosure, only drawing references to FIG. 19 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 20:
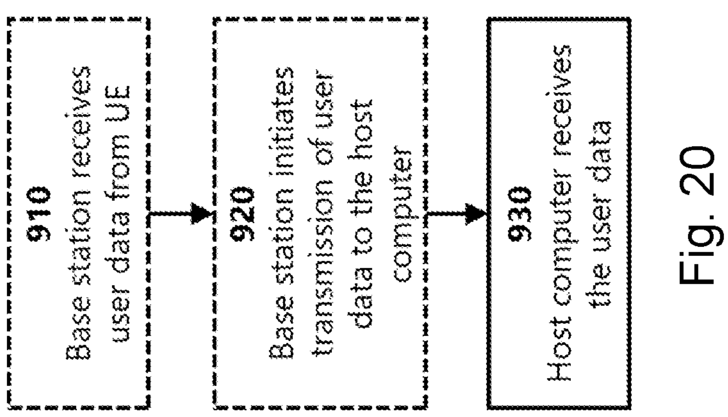
FIG. 20 is a flowchart illustrating a method implemented in a communication system, according to certain embodiments.

FIG. 20 is a flowchart illustrating a method implemented in a communication system, in accordance with one embodiment. The communication system includes a host computer, a base station and a UE which may be those described with reference to FIGURES and 16. For simplicity of the present disclosure, only drawing references to FIG. 20 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1× RTT CDMA2000 1× Radio Transmission Technology
3GPP 3rd Generation Partnership Project
5G 5th Generation
CA Carrier Aggregation
CDMA Code Division Multiplexing Access
CLI Cross-Link Interference
CQI Channel Quality information
CSI Channel State Information
DC Dual Connectivity
DCI Downlink Control Information
DFTS-OFDM Discrete Fourier Transform Spread OFDM
DL Downlink
eNB E-UTRAN NodeB
EN-DC E-UTRA NR Dual Connectivity
E-UTRA Evolved UTRA
E-UTRAN Evolved UTRAN
FDD Frequency Division Duplex
GERAN GSM EDGE Radio Access Network
gNB Base station in NR
GSM Global System for Mobile communication
HSPA High Speed Packet Access
HRPD High Rate Packet Data
LTE Long-Term Evolution
MAC Medium Access Control
MCG Master Cell Group
MN Master Node
MR-DC Multi-Radio Dual Connectivity
NR New Radio
OFDM Orthogonal Frequency Division Multiplexing
OFDMA Orthogonal Frequency Division Multiple Access
PCell Primary Cell
PGW Packet Gateway
PLMN Public Land Mobile Network
RAN Radio Access Network
RAT Radio Access Technology
RLF Radio Link Failure
RLM Radio Link Management
RNC Radio Network Controller
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCell Secondary Cell
SCG Secondary Cell Group
SGW Serving Gateway
SI System Information
SIB System Information Block
SN Secondary Node
SNR Signal to Noise Ratio
SS Synchronization Signal
SSS Secondary Synchronization Signal
TDD Time Division Duplex
UE User Equipment
UL Uplink
URLLC Ultra-Reliable and Low-Latency Communications
UMTS Universal Mobile Telecommunication System
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device capable of operating in dual connectivity with a first network node in a first cell group and a second network node in a second cell group, the method comprising:
- receiving a measurement configuration message that includes an indication to perform cross-link interference (CLI) measurements;
- detecting radio link failure (RLF) with the first cell group;
- determining that CLI measurements are available;
- including CLI measurement information in a first cell group failure report, wherein the CLI measurement information included in the first cell group failure report is less than an amount of CLI measurement information configured for radio resource management (RRM); and
- transmitting the first cell group failure report to the second network node.

2. A wireless device capable of operating in dual connectivity with a first network node in a first cell group and a second network node in a second cell group, the wireless device comprising processing circuitry operable to:
- receive a measurement configuration message that includes an indication to perform cross-link interference (CLI) measurements;
- detect radio link failure (RLF) with the first cell group;
- determine that CLI measurements are available;
- include CLI measurement information in a first cell group failure report, wherein the CLI measurement information included in the first cell group failure report is less than an amount of CLI measurement information configured for radio resource management (RRM); and
- transmit the first cell group failure report to the second network node.

3. The wireless device of claim 2, wherein the measurement configuration is received from the first network node.

4. The wireless device of claim 2, wherein the measurement configuration is received from the second network node.

5. The wireless device of claim 2, wherein the measurement configuration is received in a MeasConfig within a RRCReconfiguration or RRCResume message.

6. The wireless device of claim 2, wherein the processing circuitry is operable to detect the RLF by detecting one or more of a timer expiration, random access problem, or an indication from a radio link control layer that a maximum number of retransmissions has been reached.

7. The wireless device of claim 2, wherein the CLI measurement information is only included in the first cell group failure report when the RLF is based on one or more of a timer expiration, random access problem, or an indication from a radio link control layer that a maximum number of retransmissions has been reached.

8. The wireless device of claim 2, wherein the first network node comprises a master node (MN), the first cell group comprises a master cell group (MCG), the second network node comprises a secondary node (SN), and the second cell group comprises a secondary cell group (SCG).

9. The wireless device of claim 2, wherein the first network node comprises a secondary node (SN), the first cell group comprises a secondary cell group (SCG), the second network node comprises a master node (MN), and the second cell group comprises a master cell group (MCG).

10. A method performed by a first network node in a first cell group operating in dual connectivity with a wireless device, the method comprising:

transmitting to the wireless device a measurement configuration message that includes an indication for the wireless device to perform cross-link interference (CLI) measurements; and receiving from a second network node in a second cell group that an indication that a radio link failure occurred between the wireless device and the first cell group and CLI measurement information, wherein the CLI measurement information included in a first cell group failure report is less than an amount of CLI measurement information configured for radio resource management (RRM).

11. A first network node capable of operating in dual connectivity with a wireless device, the first network node comprising processing circuitry operable to:

transmit to the wireless device a measurement configuration message that includes an indication for the wireless device to perform cross-link interference (CLI) measurements; and receive from a second network node in a second cell group that an indication that a radio link failure occurred between the wireless device and the first cell group and CLI measurement information, wherein the CLI measurement information included in a first cell group failure report is less than an amount of CLI measurement information configured for radio resource management (RRM).

12. The first network node of claim 11, wherein the measurement configuration is transmitted in a MeasConfig within a RRCReconfiguration or RRCResume message.

13. The first network node of claim 11, wherein the measurement configuration includes an indication of one or more conditions under which the wireless device should report CLI measurements.

14. The first network node of claim 13, wherein at least one of the one or more conditions comprises a failure that relates to radio conditions.

15. The first network node of claim 13, wherein at least one of the one or more conditions comprises one or more of a timer expiration, random access problem, or an indication from a radio link control layer that a maximum number of retransmissions has been reached.

16. A first network node capable of operating in dual connectivity with a wireless device, the first network node comprising processing circuitry operable to:

receive from the wireless device a second cell group failure report, the second cell group failure report including cross-link interference (CLI) measurement information;

determine the second cell group failure report is associated with a second network node in the second cell group; and transmit to the second network node an indication that a radio link failure occurred between the wireless device and the second cell group and the CLI measurement information, wherein the CLI measurement information included in the first cell group failure report is less than an amount of CLI measurement information configured for radio resource management (RRM).

17. The first network node of claim 16, wherein the first network node comprises a master node (MN), the first cell group comprises a master cell group (MCG), the second network node comprises a secondary node (SN), and the second cell group comprises a secondary cell group (SCG).

18. The first network node of claim 16, wherein the first network node comprises a secondary node (SN), the first cell group comprises a secondary cell group (SCG), the second network node comprises a master node (MN), and the second cell group comprises a master cell group (MCG).

* * * * *